United States Patent [19]

Takahashi et al.

[11] Patent Number: 4,699,475

[45] Date of Patent: Oct. 13, 1987

[54] ZOOM LENS INCLUDING A WIDE ANGLE OF VIEW

[75] Inventors: Tomowaki Takahashi, Tokyo; Yasuhiro Aono, Kawasaki, both of Japan

[73] Assignee: Nippon Kogaku K. K., Tokyo, Japan

[21] Appl. No.: 435,710

[22] Filed: Oct. 21, 1982

[30] Foreign Application Priority Data

Nov. 4, 1981 [JP] Japan ................... 56-176831

[51] Int. Cl.$^4$ ........................... G02B 15/14
[52] U.S. Cl. ......................... 350/427; 350/423
[58] Field of Search .............. 350/423, 427, 428

[56] References Cited

U.S. PATENT DOCUMENTS 3,481,666 12/1969 Higuchi ..................... 350/427
3,549,242 12/1970 Higuchi et al. ............ 350/427 X
4,240,700 12/1980 Ogawa et al. ............. 350/423
4,348,082 9/1982 Ogawa ..................... 350/423
4,437,732 3/1984 Ishiyama .................. 350/427

FOREIGN PATENT DOCUMENTS 56-165107 12/1981 Japan ..................... 350/423

Primary Examiner—John K. Corbin
Assistant Examiner—Scott J. Sugarman
Attorney, Agent, or Firm—Shapiro and Shapiro

[57] ABSTRACT

A zoom lens including a wide angle of view has, in succession from the object side, a first lens group of positive refractive power, a second lens group of negative refractive power and a third lens group of positive refractive power. The zoom lens is capable of effecting magnification change by the second lens group being moved relative to the first and third lens groups. When zooming is effected from the wide angle end to the telephoto end, the first and third lens groups are monotonously moved toward the object side and the second lens group is moved toward the object side at least near the wide angle end.

25 Claims, 39 Drawing Figures

ZOOM LENS INCLUDING A WIDE ANGLE OF VIEW

BACKGROUND OF THE INVENTION

1. Field of the Invention

This invention relates to a zoom lens including a wide angle of view in which the maximum angle of view exceeds 60° and having a relatively wide magnification change area from the so-called wide angle to the quasitelephoto.

2. Description of the Prior Art

Various zoom lenses of this type for 35 mm format still cameras have been proposed in recent years and for example, Japanese Laid-open Patent Applications Nos. 30855/1979, 156912/1980 and 1009/1981 disclose such zoom lenses. Any of these basically comprises, in succession from the object side, a positive first lens group, a negative second lens group and a positive third lens group and, when zooming is effected from the wide angle end to the telephoto end, the magnification change effect is provided by the second lens group being moved in a direction towrad the image plane. Excellent zoom lenses having a maximum angle of view of about 60°, a zoom ratio of about 3 and F-number 3.5 or so have accordingly been put into practical use. Since, however, the first lens group has a positive refractive power, a light ray of a great angle of view forms a great angle with respect to the optical axis at the wide angle side after it has passed through the first lens group and therefore, the position at which the principal light ray of a great angle of view passes through the first lens group becomes greatly distant from the optical axis and as a result, increasing the aperture of the forward lens has been unavoidable to secure a sufficient quantity of marginal light. This tendency becomes more remarkable when the first lens group as the focusing group is moved toward the object side for short distance photography and therefore, the aperture of the foremost lens has unavoidably been made very great as compared with a wide angle lens of fixed focal length having the same angle of view. For example, making a comparison between photographic lenses for 35 mm format single lens reflex cameras, in the so-called wide angle lens having a focal length of 35 mm and F-number 2, the diameter of the filter mounted on the foremost portion is usually 45-52 mm, whereas in the zoom lens of focal length 35-105 mm including a wide angle of view which is now in practical use, the diameter of the filter is as great as 55-72 mm in spite of F-number 3.5 or so and as a result, the shape of the entire lens is large and the weight thereof is great and thus, such a zoom lens has never been satisfactory in respect of operability and portability.

SUMMARY OF THE INVENTION

It is an object of the present invention to provide a zoom lens of high magnification change rate which includes a wide angle in which the maximum angle of view exceeds 60° and yet in which the aperture of the foremost lens is small and accordingly the shape of the entire lens is small and moreover, an excellent imaging performance is maintained over the entire magnification change area.

To achieve such object, the zoom lens according to the present invention has, in succession from the object side, a first lens group of positive refractive power, a second lens group of negative refractive power and a third lens group of positive refractive power, and is designed such that when zooming is effected from the wide angle end to the telephoto end, the first and third lens groups are monotonously moved toward the object side and the second lens group is moved toward the object side at least near the wide angle end.

As the result of the various studies made on the conventional three-group zoom lens prior to the present invention, it has been found that the position of the principal light ray passing through the first lens group becomes most distant from the optical axis at the wide angle end, i.e., in the shortest focal length condition or in the condition in which magnification change has been effected slightly toward the long focal length side. Specifically, in a zoom lens having a focal length of 35-105 mm as zoom lens for 35 mm still camera, it has been confirmed that there is the tendency that the position of the principal light ray passing through the foremost lens becomes most distant from the optical axis when the focal length is 40-60 mm.

Therefore, in the present invention, when magnification change is effected from the wide angle end slightly toward the long focal length side, the second lens group is moved so as to lie more adjacent to the object side than the position at the wide angle end, whereby the position of the principal light ray passing through the foremost lens is kept at a position near the optical axis.

The invention will become more fully apparent from the following detailed description thereof taken in conjunction with the accompanying drawings.

BRIEF DESCRIPTION OF THE DRAWINGS

FIGS. 16A, 16B and 16C to 22A, 22B, and 22C show the various aberrations in the first to second embodiments.

DESCRIPTION OF THE PREFERRED EMBODIMENTS

Figure 1:
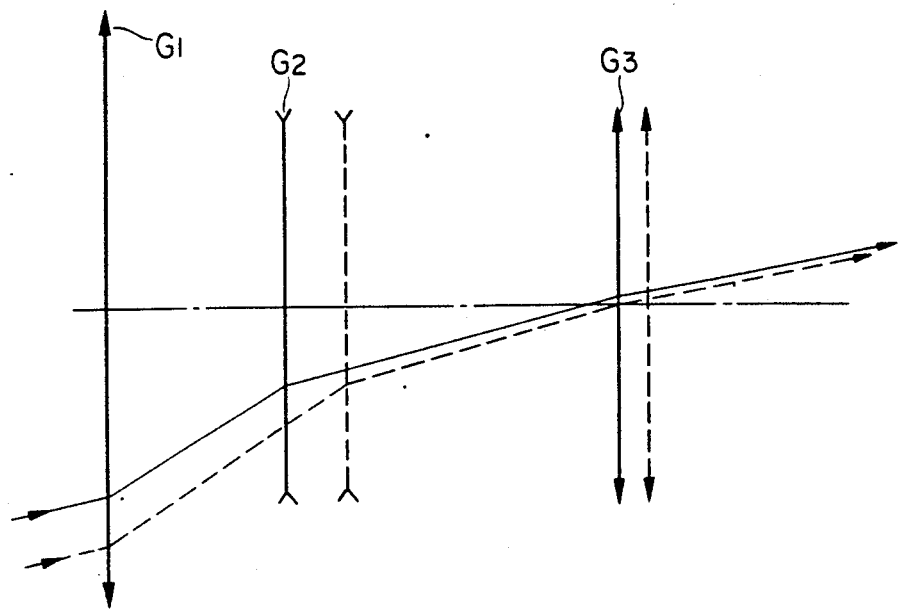
FIG. 1 illustrates the fundamental principle of the present invention.

FIG. 1 illustrates the fundamental principle of the present invention and shows, in a three-group zoom lens comprising, in succession from the object side, a positive first group $G_1$, a negative second group $G_2$ and a positive third group $G_3$, a condition in which the position of the principal light ray of a maximum angle of view which cuts the first group $G_1$ is most distant from the optical axis, namely, the condition of the principal light ray at the magnification changing position slightly more adjacent to the long focus side than the wide angle end. In FIG. 1, a case where the second group $G_2$ lies more adjacent to the image side than the position according to the present invention is indicated by dotted lines. As shown, according to the moving system of the present invention, it is apparent that the position at which the principal light ray cuts the first group $G_1$ is nearer to the optical axis and the aperture of the foremost lens can be kept small. Thus, it is clear in principle that the aperture of the foremost lens is maintained small by moving the second group toward the object side when it is to be moved from the wide angle end to the telephoto end. At this time, the amount of magnification change by the second group varies and therefore, the third group must also be moved to keep the amount of magnification change in the entire system the same.

Figure 2A:
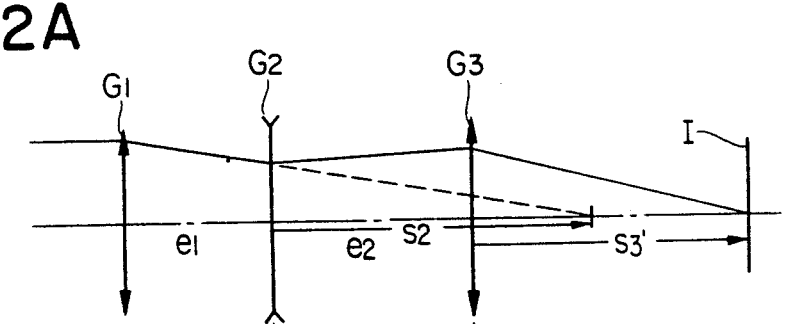
FIGS. 2A and 2B illustrate the relation between the amount of movement of a second lens group according to the present invention toward the object side and the amount of movement of a third lens group when they are moved for magnification change from the wide angle end slightly toward the long focal length side.

Reference is now had to FIG. 2 to describe the amount of movement of the second group toward the object side and the amount of movement of the third group according to the present invention when these groups are moved for magnification change from the wide angle end slightly toward the long focal length side. FIG. 2A shows the power arrangement at the zooming position in which the position whereat the principal light ray of a maximum angle of view passes through the first lens group $G_1$ is most distant from the optical axis. If, in this power arrangement, the focal length of the entire system is $f_M$ and the focal lengths of the first to third lens groups are $f_1$, $f_2$ and $f_3$, respectively, and the magnifications of the second and third lens groups are $\beta_{2M}$ and $\beta_{3M}$, respectively, and the object point distant to the second lens group is $S_2$ and the image point distance, i.e., the back focal length, of the third lens group is $S'_3$, then $$f_M = f_1 \beta_{2M} \beta_{3M} \quad (1)$$

$$\beta_{2M} = \frac{f_2}{f_2 + S_2} \quad (2)$$

$$\beta_{3M} = \frac{f_3 - S'_3}{f_3} \quad (3)$$

Figure 2B:
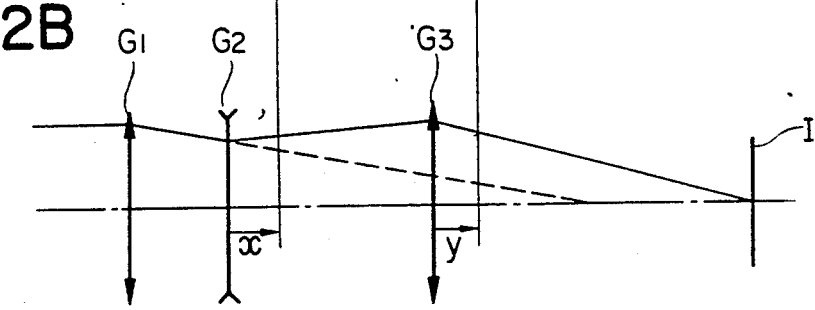

It is to be understood that the stop is integral with the second lens group or the third lens group or placed at a suitable position between those two lens groups. FIG. 2B shows a condition in which the position of the second lens group has been moved by x from the position of FIG. 2A toward the object side and the third lens group has been moved by y to keep the focal length $f_M$ of the entire system invariable even in such condition. At this time, the relation between x and y is expressed as:

$$y = -x \left( 1 + \frac{\phi_2 + \phi_3 - \phi_2\phi_3 e_2}{\phi_1\phi_2 x - (\phi_1 + \phi_2 - \phi_1\phi_2 e_1)} \cdot \frac{\phi_1}{\phi_3} \right)$$

where $\phi_i$ represents the power of the ith lens group and $e_i$ represents the principal point spacing between the ith lens group and the (i+1)th lens group in FIG. 2A. If the magnifications of the second and third lens groups in FIG. 2B are expressed as $\beta'_{2M}$ and $\beta'_{3M}$, respectively, $$f_M = f_1 \beta'_{2M} \beta'_{3M} \quad (4)$$

$$\beta'_{2M} = \frac{f_2}{f_2 + (S_2 + x)} \quad (5)$$

$$\beta'_{3M} = \frac{f_3 - (S'_3 + y)}{f_3} \quad (6)$$

As is apparent from equations (2) and (5), $\beta_{2M} < \beta'_{2M}(<0)$ and therefore from equation (4), $\beta'_{3M} < \beta_{3M}(<0)$. Hence, from equations (3) and (6), y must be $y > 0$. That is, if the second lens group is brought close to the first lens group by x, the third lens group must also be moved so as to come near the first lens group by y at the same time. In FIG. 2, symbol I designates the image plane. Thus, in the present invention, when zooming is effected from the wide angle end slightly toward the long focal length side, the third group must also be moved toward the object side with the movement of the second group toward the object side. Accordingly, the position of the entrance pupil of the entire lens system can be greatly moved toward the object side and therefore, the position at which the principal light ray of a maximum angle of view passes through the first group can be brought closer to the optical axis.

Figure 3A:
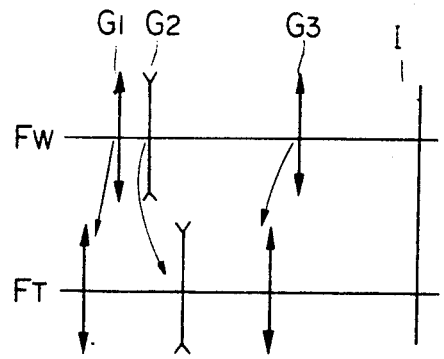
FIGS. 3A, 3B and 3C show examples of the magnification changing system of a three-group zoom lens to which the principle of the present invention is applied.
Figure 3B:
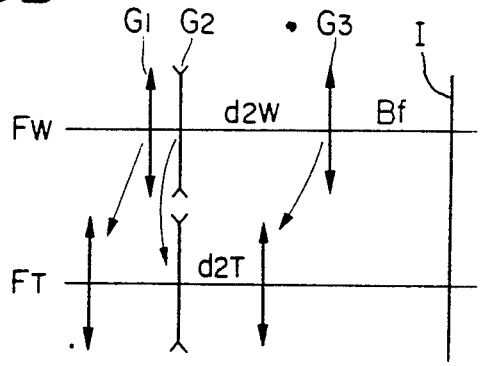
Figure 3C:
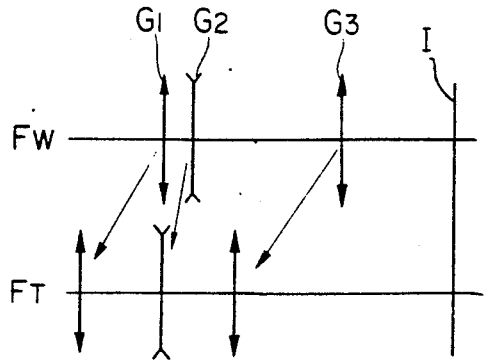

The magnification changing system of the three-group zoom lens to which the above-described principle of the present invention is applied may be classified into three types A, B and C as shown in FIGS. 3A, 3B and 3C. This classification is based on the manner in which the magnification change effect is allotted to the second group and the third group.

In each of FIGS. 3A, 3B and 3C, the upper portion shows the condition of the shortest focal length $F_W$ as the wide angle end by zooming, and the lower portion shows the condition of the longest focal length $F_T$ as the telephoto end. In the magnification changing system of type A shown in FIG. 3A, a primary magnification changing action is allotted to the second group $G_2$ and some magnification changing action is allotted to the third group $G_3$. The second group $G_2$ is moved toward the object side up to substantially the intermediate position between the wide angle end and the telephoto end, and then is moved toward the image side and, at the telephoto end, approaches the image side rather than the position at the wide angle end. The first group $G_1$ and the third group $G_3$ are substantially monotonously moved toward the object side. In the magnification changing system of type B shown in FIG. 3B, a magnification changing action greater than in the case of type A is allotted to the third group $G_3$. The position of the second group $G_2$ at the wide angle end and the telephoto end relative to the image plane I are equal to each other, and the second group depicts a locus convex toward the object side so that it lies more adjacent to the object side in the intermediate position. The first group $G_1$ and the third group $G_3$ are monotonously moved toward the object side. In the magnification changing system of type C shown in FIG. 3C, a still greater magnification changing action is allotted to the third group $G_3$ and all groups are moved toward the object side relative to the image plane I. Not only in type C but also in the other types, the image plane position correcting action may be allotted to any of the three groups, but desirably it may be allotted to the second group or the third group of which the amount of movement is relatively small.

The locus of each group may be variable depending on the manner in which the magnification changing actions allotted to the second group G₂ and the third group G₃ are balanced. Accordingly, the movement locus of each group shown in FIGS. 3A to 3C merely shows the epitome of the direction of movement.

Assuming that the zoom ratio by the entire lens system is $v$ and the ratio of the magnification at the wide angle end by the second group alone to the magnification at the telephoto end is $v_2$, $v_2 < v$ in each of the above-described types. Thus, the magnification changing action of the second group G₂ will be hereinafter be considered with respect to the above-described type B. If, in the zooming system of type B, the focal length of the third lens group is $f_3$ and the magnifications of the third lens group at the wide angle end and the telephoto end are $\beta_{3W}$ and $\beta_{3T}$, respectively, and the principal point spacings between the second lens group and the third lens group at the wide angle end and the telephoto end are $d_{2W}$ and $d_{2T}$, respectively and the spacing between the third lens group at the wide angle end and the image point, i.e., the back focal length, is $B_f$, then $$v_2 \cdot \frac{\beta_{3T}}{\beta_{3W}} = v \quad (7)$$

$$\beta_{3W} = \frac{f_3 - B_f}{f_3} \quad (8)$$

Also, the second lens group at the wide angle end and at the telephoto end lies at the same position relative to the image plane and therefore, the back focal length at the telephoto end is $(B_f + d_{2W} - d_{2T})$. Accordingly, $$\beta_{3T} = \frac{f_3 - (B_f + d_{2W} - d_{2T})}{f_3} \quad (9)$$

From the above three equations (7)–(9), $v_2$ may be expressed as follows by using $f_3$, $B_f$, $d_{2T}$ and $d_{2W}$:

$$v_2 = \frac{v}{1 + \frac{d_{2T} - d_{2W}}{f_3 - B_f}} \quad (10)$$

Here, $f_3$, $B_f$, $d_{2W}$ and $d_{2T}$ are values which give the basic construction of the three-group zoom lens, and equation (10) is the fundamental formula of the magnification change rate allotted to the second group in the three-group zoom lens of type B. In the magnification changing system of type A, the magnification change rate allotted to the second group is greater than $v_2$ in type B, and in the magnification changing system of type C, the magnification change rate allotted to the second group is smaller than $v_2$ in type B.

As the result of the above-described consideration with respect to the magnification changing action allotted to the second group, it has been found that the effect of the present invention can be more enhanced by satisfying the following condition:

$$0.5 < v_2/v < 0.9 \quad (11)$$

That is, if the magnification changing action of the second lens group becomes smaller than the lower limit of condition (11), the amounts of movement of the first and third lens groups will become too great when zooming is effected from the wide angle end to the telephoto end, and thus the full length of the lens will become great. Also, the position at which the on-axis light beam passes through the second and third lens groups at the telephoto end will become distant from the optical axis and therefore, the second and third lens groups will become too large. If the magnification changing action of the second lens group becomes greater than the upper limit of condition (11), the position of the second lens group at the telephoto end will come much nearer the image side than the position thereof at the wide angle end and therefore, if the operation of bringing the second and third lens groups close to the object side is effected at the intermediate position, the amount of movement of the second lens group between the intermediate position and the telephoto end will become too great and the fluctuation of aberrations, particularly, spherical aberration and curvature of image field, will become so great that correction thereof will be difficult. Also, as compared with the movement of the first and third lens groups, the movement of the second lens group will become extremely great and this will lead to difficulties in mechanism.

Embodiments of the present invention will hereinafter be described.

Each embodiment is a zoom lens for a 35 mm still camera having a focal length of 35–105 mm, a zoom ratio of 3 and F-number 3.5 or so. A first embodiment belongs to the magnification changing system of type A, a second embodiment belongs to the magnification changing system of type B, and third to seventh embodiments belong to the magnification changing system of type C. First, the manner of movement of each group for magnification change will be described with respect to each embodiment by reference to FIGS. 4 to 7. In these figures, F_W represents the shortest focal length condition as the wide angle end and F_T represents the longest focal length condition as the telephoto end, and the locus represents the amount of on-axis movement of each lens group relative to the angle of rotation of a cam cylinder generally used in a zoom lens. Accordingly, the lens group having a locus indicated by a straight line is moved on the optical axis always at a predetermined rate relative to the angle of rotation of the cam cylinder. Moving means for each group is of course not restricted to a helicoid or a cam cylinder.

Figure 4:
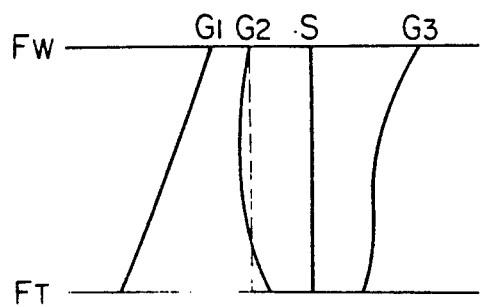
FIGS. 4-7 illustrate the part of development of each cam cylinder which shows the manner of movement of each lens group for magnification change in respective embodiments of the present invention.

The first embodiment belonging to type A has the magnification changing system of each group as shown in FIG. 4, and the first group G₁ thereof is rectilinearly moved toward the object side from the wide angle end to the telephoto end, and the second group G₂ thereof depicts a curve convex toward the object side and is positioned most adjacent to the object side at the intermediate position between the wide angle end and the telephoto end. The third group G₃ has the function of correcting the image plane and therefore, it is monotonously moved while depicting an S-shaped non-linear locus having a point of inflection. The word "monotonously" means that the ratio of change of the movement is in either positive or negative condition including zero over the magnification change range. The stop S is fixed relative to the image plane. In the present embodiment, the position at which the marginal light ray from the infinite object point on the axis passes through the second and third groups at the telephoto end comes near the optical axis and therefore, the apertures of the second and third groups can be made small and it is easy to render the brightness at the telephoto end the same as the brightness at the wide angle end.

Figure 5:
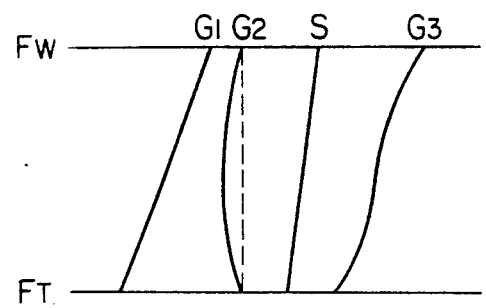

The second embodiment belonging to type B has the magnification changing system as shown in FIG. 5. The first group $G_1$ is moved rectilinearly. The second group $G_2$ has the same positions at the wide angle end and the telephoto end relative to the image plane, but is smoothly moved so that it is positioned most adjacent to the object side at the intermediate position. The third group $G_3$ is moved substantially similarly to the third group of the first embodiment. The stop S is rectilinearly moved toward the object side independently of each lens group when magnification change is effected from the wide angle end to the telephoto end.

Figure 6:
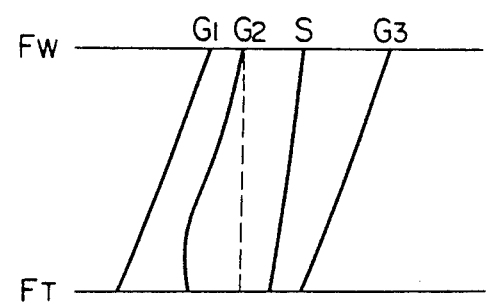

The third embodiment belonging to type C has the magnification changing system as shown in FIG. 6. The first group $G_1$, like the first group of the first and second embodiments, is moved rectilinearly. The second group $G_2$ is monotonously moved toward the object side while depicting a non-linear locus when magnification change is effected from the wide angle end to the telephoto end, and is positioned more adjacent to the object side at the telephoto end than at the wide angle end. The third group $G_3$ can be designed to be rectilinearly moved at the same velocity as the first group $G_1$ and with the first group. The second group $G_2$ has, in addition to the magnification changing function, the correcting function for keeping the image plane at a predetermined position. The stop S is moved independently of each group as in the second embodiment. In the magnification changing system of this type, all the lens groups are moved in the same direction and therefore, such system is advantageous to make a so-called single operation zoom lens in which focusing and magnification change is effected by the same operating ring.

Figure 7:
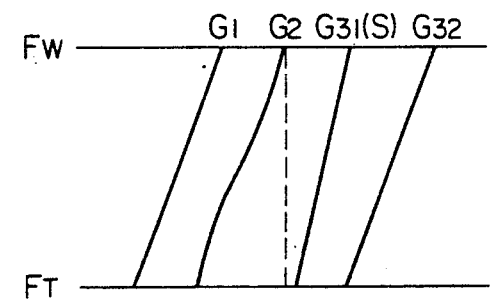

The fourth to seventh embodiments of the present invention have the magnification changing system as shown in FIG. 7, and these are constructed by dividing the positive third group into two positive lens groups $G_{31}$ and $G_{32}$ as the forward group and the rearward group and basically belong to type C. The first group $G_1$ is rectilinearly moved as in the previously described embodiments. The second group $G_2$ is monotonously moved toward the object side when magnification change is effected from the wide angle end to the telephoto end, but it has a point of inflection at the intermediate position. The two positive lens groups $G_{31}$ and $G_{32}$ compositely have the function substantially as the third group, and both of them are rectilinearly moved toward the object side when magnification change is effected from the wide angle end to the telephoto end, but the positive lens group $G_{32}$ on the image side is greater in amount of movement. Again, the second group $G_2$ has the magnification changing function and the image plane correcting function. The stop S is moved with the positive lens group $G_{31}$ in the third group which is adjacent to the object side. In this case, if the third lens group is divided into two positive lens groups $G_{31}$ and $G_{32}$ and these two lens groups are brought close to each other at the telephoto end rather than at the wide angle end, the power of the entire third lens group at the telephoto end will become stronger than that at the wide angle end. Therefore, the magnification increasing effect of the third lens group will be obtained for an amount of movement smaller than the amount of movement of the third lens group as a unit. Since, at the telephoto end, the principal point of the third lens group is moved forwardly of the position at the wide angle end, the spacing $d_{2T}$ between the second lens group and the third lens group at the telephoto end can be made small. The spacing $d_{2W}$ between the second lens group and the third lens group at the wide angle end can also be made correspondingly small, and this is more advantageous in that reduction in diameter of the front lens is possible, and the full length of the lens can be made shorter.

Further, in the fourth to seventh embodiments, the movement of the second lens group can be made substantially rectilinear by selecting the rate of movement of the lens groups $G_{31}$ and $G_{32}$ to 0.5:1.0–0.9:1.0, and thus any manufacturing error by the point of inflection of the cam can be prevented. In some cases, these embodiments can also be made into an optical correction type.

Figure 8:
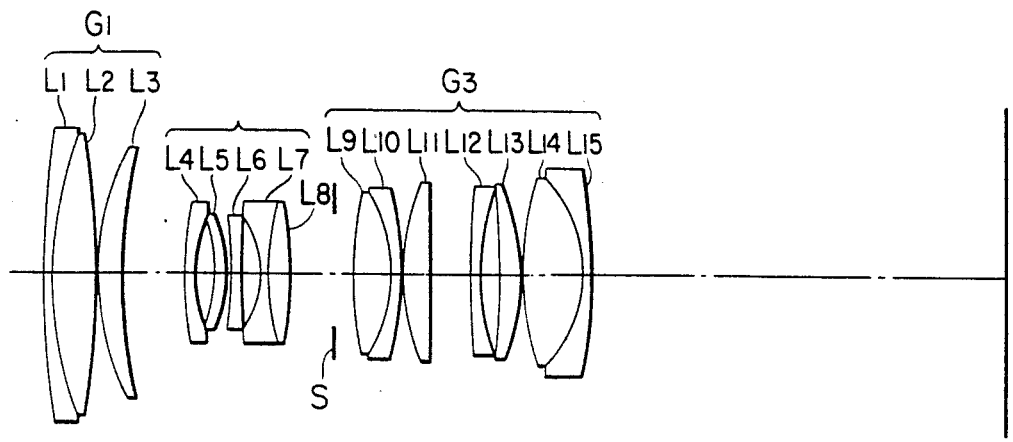
FIG. 8 shows the lens construction of a first embodiment.

The lens construction of each embodiment will now be described. The lens construction of the first embodiment is as shown in FIG. 8, wherein the first group $G_1$ comprises, in succession from the object side, a negative meniscus lens $L_1$ having its convex surface facing the object side, a biconvex positive lens $L_2$ cemented thereto, and a positive meniscus lens $L_3$ having its convex surface facing the object side, and the second group $G_2$ comprises, in succession from the object side, a negative meniscus lens $L_4$ having its convex surface facing the object side, a positive meniscus lens $L_5$ having its convex surface facing the image side, a negative lens $L_6$ having its surface of sharper curvature facing the object side, a biconcave lens $L_7$ and a biconvex lens $L_8$ cemented thereto. The third group $G_3$ comprises, in succession from the object side, a positive lens $L_9$ having its surface of sharper curvature facing the image side, a negative meniscus lens $L_{10}$ cemented thereto and having its convex surface facing the image side, a positive lens $L_{11}$ having its surface of sharper curvature facing the object side, a negative lens $L_{12}$ having its surface of sharper curvature facing the image side, a positive lens $L_{13}$ having its surface of sharper curvature facing the image side, a positive lens $L_{14}$ having its surface of sharper curvature facing the image side, and a negative lens $L_{15}$ cemented thereto and having its surface of sharper curvature facing the object side.

Figure 9:
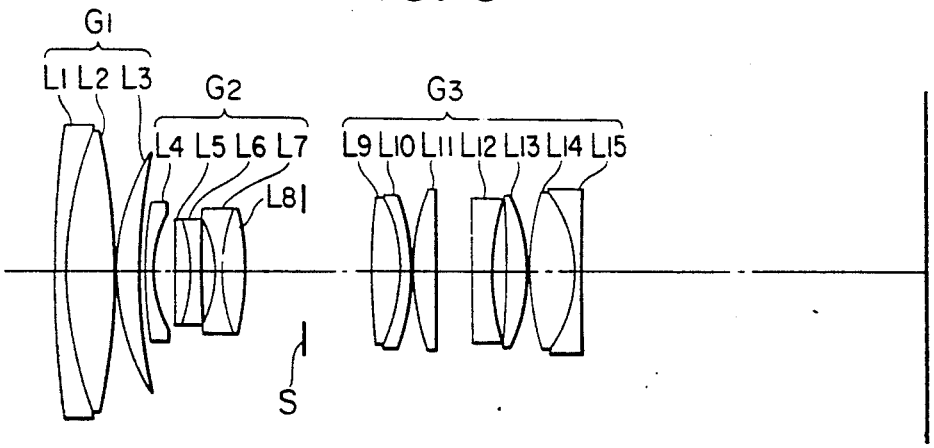
FIG. 9 shows the lens construction of a second embodiment.
Figure 10:
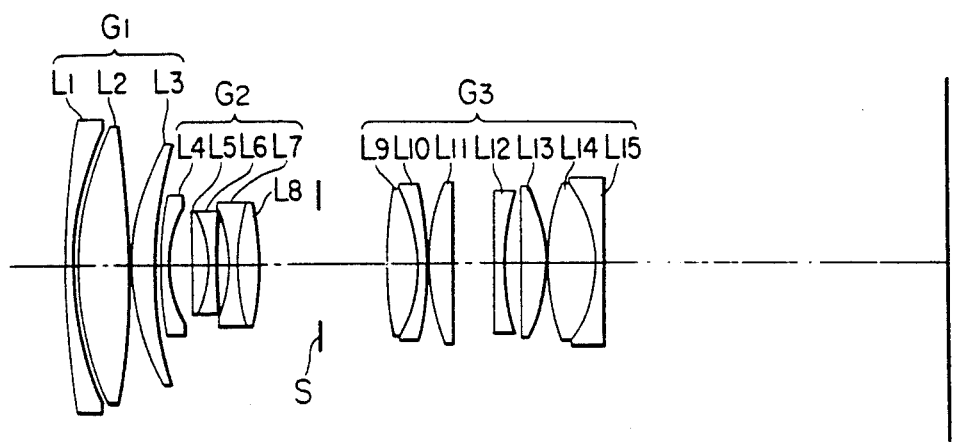
FIG. 10 shows the lens construction of a third embodiment.
Figure 11:
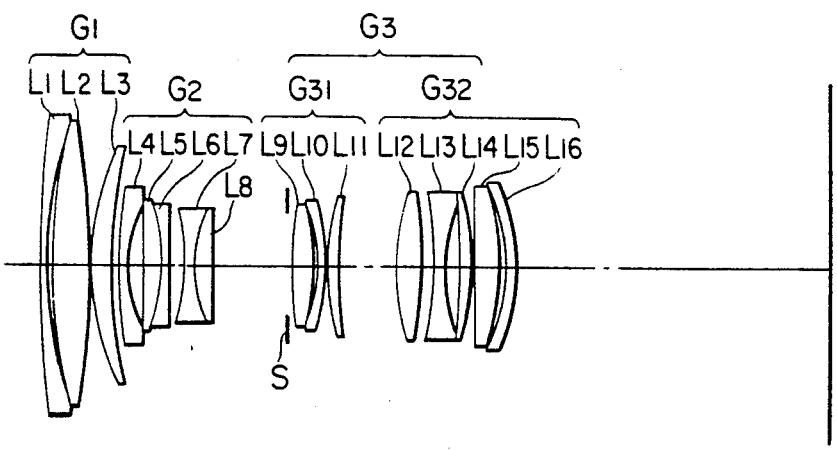
FIGS. 11-14 show the lens constructions of fourth to seventh embodiments.
Figure 12:
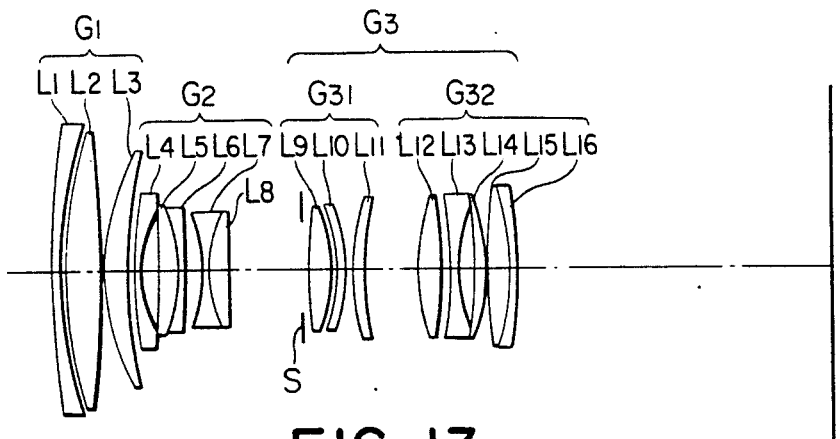
Figure 13:
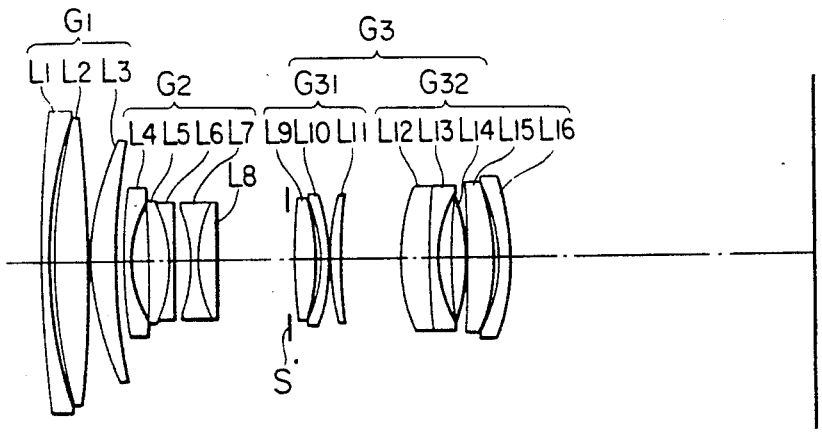
Figure 14:
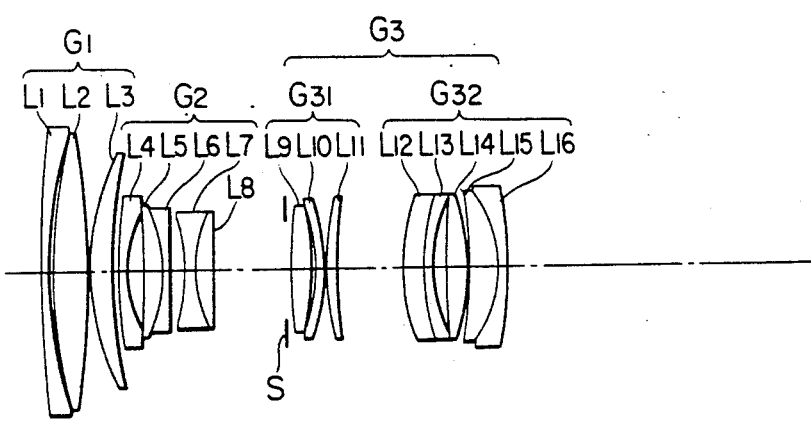

The lens construction of the second embodiment, as shown in FIG. 9, is similar to that of the first embodiment with the exception that the positive lens $L_5$ and the negative lens $L_6$ in the second group $G_2$ are cemented together. The lens construction of the third embodiment, as shown in FIG. 10, is also similar to that of the first or second embodiment with the exception that the negative meniscus lens $L_1$ and the biconvex positive lens $L_2$ in the first group $G_1$ are separated from each other.

In the first to third embodiments, the shapes of the positive lens $L_{11}$ in the third group $G_3$ having its surface of sharper curvature facing the object side and the negative lens $L_{12}$ having its surface of sharper curvature facing the image side are characteristic, and when the shape factors of these two lenses are $q_{11}$ and $q_{12}$, it is desirable in correction of the various aberrations over the entire magnification change area, particularly, spherical abberation, coma and astigmatism that the following conditions be satisfied:

$$0.8 < q_{11} < 1.2$$

$$0.7 < |q_{12}| < 2.0$$

The shape factor q is generally defined as $$q = \frac{R_2 + R_1}{R_2 - R_1}$$

where $R_1$ is the radius of curvature of the surface of a lens which is adjacent to the object side $R_2$ is the radius of curvature of the surface of the lens which is adjacent to the image side.

Any of the fourth to seventh embodiments belongs to type C are previously mentioned, and in these embodiments, the third group $G_3$ comprises two independently movable positive lens groups $G_{31}$ and $G_{32}$. In these embodiments, as shown in FIGS. 11-14 which show the lens constructions thereof, the first group $G_1$ and the second group $G_2$ comprise lens constructions approximately similar to the third embodiment shown in FIG. 10. In the fourth to seventh embodiments, the forward group $G_{31}$ in the third group $G_3$ has an approximately common construction and comprises, in succession from the object side, a biconvex positive lens $L_9$ having its surface of sharper curvature facing the image side, a negative meniscus lens $L_{10}$ having its convex surface facing the image side, and a positive meniscus lens $L_{11}$ having its convex surface facing the object side. When the shape factors of these lenses of the forward group $G_{31}$ in the third group are $q_{10}$, $q_{11}$ and $q_{12}$, it is desirable in correction of the various aberrations over the entire magnification change area, particularly, spherical aberration, coma and astigmatism that the following conditions be satisfied:

$$0.3 < |q_9| < 1.0$$

$$2.0 < q_{10} < 5.0$$

$$3.0 < q_{11} < 8.0$$

As regards the rearward group $G_{32}$ in the third group, the fourth and fifth embodiments are similar to each other, and the rearward group $G_{32}$ comprises, in succession from the object side, a biconvex positive lens $L_{12}$, a biconcave lens $L_{13}$, a positive lens $L_{14}$ having its surface of sharper curvature facing the image side, a positive lens $L_{15}$, and a negative meniscus lens $L_{16}$ having its convex surface facing the image side. In the fifth embodiment, lenses $L_{14}$ and $L_{15}$ are cemented together. The rearward group $G_{32}$ in the third group in the sixth embodiment and the rearward group $G_{32}$ in the third group in the seventh embodiment are similar to each other, and each of them comprises, in succession from the object side, a positive meniscus lens $L_{12}$ having its convex surface facing the object side, a negative meniscus lens $L_{13}$ cemented thereto and having its convex surface facing the object side, a positive lens $L_{14}$ having its surface of sharper curvature facing the image side, a positive lens $L_{15}$ having its surface of sharper curvature facing the image side, and a negative meniscus lens $L_{16}$ having its convex surface facing the image side. In the seventh embodiment, lenses $L_{15}$ and $L_{16}$ are cemented together. When the focal length of the rearward group $G_{32}$ in the third group is $f_{32}$ and as regards the positive meniscus lens $L_{12}$ and the negative meniscus lens $L_{13}$ cemented to each other, the radius of curvature of the surface of the positive meniscus lens $L_{12}$ which is adjacent to the object side is $r_a$ and the radius of curvature of the surface of the negative meniscus lens $L_{13}$ which is adjacent to the image side is $r_b$, it is desirable in correction of sperical aberration, coma and astigmatism that the following conditions be satisfied:

$$0.2 < r_a/f_{32} < 0.4$$

$$0.2 < r_b/f_{32} < 0.4$$

The numerical data of the respective embodiments will be shown in Tables 1-7 below. In each table, successive values from the object side are shown and the subscript numbers represent the order from the object side.

TABLE 1

(First Embodiment)

Focal length F = 35~105, Zoom ratio 3, F-number 3.5, Image height y = 21.6

| | Radius of curvature | | Center thickness and air space | | Refractive index | | Abbe number | | |
|---|---|---|---|---|---|---|---|---|---|
| $r_1$ | 130.39 | $d_1$ | 1.3 | $n_1$ | 1.784 | $v_1$ | 26.0 | $L_1$ | |
| $r_2$ | 51.24 | $d_2$ | 7.7 | $n_2$ | 1.563 | $v_2$ | 60.8 | $L_2$ | |
| $r_3$ | −135.31 | $d_3$ | 0.1 | | | | | | $G_1$ |
| $r_4$ | 34.94 | $d_4$ | 4.5 | $n_3$ | 1.603 | $v_3$ | 60.6 | $L_3$ | |
| $r_5$ | 79.56 | $d_5$ | variable | | | | | | |
| $r_6$ | 51.99 | $d_6$ | 1.0 | $n_4$ | 1.772 | $v_4$ | 49.4 | $L_4$ | |
| $r_7$ | 16.04 | $d_7$ | 4.0 | | | | | | |
| $r_8$ | −31.09 | $d_8$ | 2.0 | $n_5$ | 1.756 | $v_5$ | 31.7 | $L_5$ | |
| $r_9$ | −25.98 | $d_9$ | 0.8 | | | | | | |
| $r_{10}$ | −43.98 | $d_{10}$ | 1.3 | $n_6$ | 1.713 | $v_6$ | 53.9 | $L_6$ | $G_2$ |
| $r_{11}$ | −251.47 | $d_{11}$ | 3.0 | | | | | | |
| $r_{12}$ | −16.14 | $d_{12}$ | 1.0 | $n_7$ | 1.620 | $v_7$ | 60.2 | $L_7$ | |
| $r_{13}$ | 32.55 | $d_{13}$ | 4.5 | $n_8$ | 1.756 | $v_8$ | 31.7 | $L_8$ | |
| $r_{14}$ | −42.44 | $d_{14}$ | variable | | | | | | |
| $r_{15}$ | 58.50 | $d_{15}$ | 6.5 | $n_9$ | 1.501 | $v_9$ | 56.4 | $L_9$ | |
| $r_{16}$ | −21.24 | $d_{16}$ | 1.2 | $n_{10}$ | 1.796 | $v_{10}$ | 45.5 | $L_{10}$ | |
| $r_{17}$ | −57.27 | $d_{17}$ | 0.1 | | | | | | |
| $r_{18}$ | 28.31 | $d_{18}$ | 5.0 | $n_{11}$ | 1.514 | $v_{11}$ | 54.6 | $L_{11}$ | |
| $r_{19}$ | −1023.03 | $d_{19}$ | 6.3 | | | | | | |
| $r_{20}$ | 128.42 | $d_{20}$ | 1.5 | $n_{12}$ | 1.755 | $v_{12}$ | 27.6 | $L_{12}$ | $G_3$ |
| $r_{21}$ | 32.68 | $d_{21}$ | 3.4 | | | | | | |
| $r_{22}$ | −157.59 | $d_{22}$ | 3.4 | $n_{13}$ | 1.518 | $v_{13}$ | 60.3 | $L_{13}$ | |
| $r_{23}$ | −33.35 | $d_{23}$ | 0.2 | | | | | | |
| $r_{24}$ | 36.88 | $d_{24}$ | 11.0 | $n_{14}$ | 1.516 | $v_{14}$ | 64.1 | $L_{14}$ | |
| $r_{25}$ | −19.33 | $d_{25}$ | 1.0 | $n_{15}$ | 1.796 | $v_{15}$ | 45.5 | $L_{15}$ | |
| $r_{26}$ | −95.09 | | | | | | | | |

| | $F_W = 36.2$ | $F_M = 60$ | $F_T = 103$ |
|---|---|---|---|
| $d_5$ | 1.12 | 10.22 | 21.60 |
| $d_{14}$ | 17.94 | 9.80 | 2.37 |
| Stop, behind $L_8$ | 14.6 | 3.2 | 1.6 |
| Bf | 57.67 | 69.12 | 70.72 |
| | $v_2 = 2.204$ | | |

TABLE 2

(Second Embodiment)

Focal length F = 35~105, Zoom ratio 3, F-number 3.5~4.3, Image height y = 21.6

| | Radius of curvature | | Center thickness and air space | | Refractive index | | Abbe number | | |
|---|---|---|---|---|---|---|---|---|---|
| $r_1$ | 178.48 | $d_1$ | 1.3 | $n_1$ | 1.755 | $v_1$ | 27.6 | $L_1$ | |
| $r_2$ | 46.12 | $d_2$ | 8.5 | $n_2$ | 1.547 | $v_2$ | 53.6 | $L_2$ | |
| $r_3$ | −101.71 | $d_3$ | 0.1 | | | | | | $G_1$ |
| $r_4$ | 32.61 | $d_4$ | 4.0 | $n_3$ | 1.603 | $v_3$ | 60.6 | $L_3$ | |
| $r_5$ | 73.64 | $d_5$ | variable | | | | | | |
| $r_6$ | 62.48 | $d_6$ | 1.0 | $n_4$ | 1.796 | $v_4$ | 40.9 | $L_4$ | |
| $r_7$ | 15.51 | $d_7$ | 4.1 | | | | | | |
| $r_8$ | −172.67 | $d_8$ | 2.7 | $n_5$ | 1.795 | $v_5$ | 28.5 | $L_5$ | |
| $r_9$ | −25.48 | $d_9$ | 1.3 | $n_6$ | 1.796 | $v_6$ | 40.9 | $L_6$ | $G_2$ |
| $r_{10}$ | 272.88 | $d_{10}$ | 2.2 | | | | | | |
| $r_{11}$ | −16.25 | $d_{11}$ | 1.0 | $n_7$ | 1.582 | $v_7$ | 46.4 | $L_7$ | |

TABLE 2-continued (Second Embodiment)

| | | | | | | | | |
|---|---|---|---|---|---|---|---|---|
| $r_{12}$ | 32.07 | $d_{12}$ | 3.7 | $n_8$ | 1.795 | $\nu_8$ | 28.5 | $L_8$ |
| $r_{13}$ | −40.23 | $d_{13}$ | variable | | | | | |
| $r_{14}$ | 62.70 | $d_{14}$ | 5.5 | $n_9$ | 1.501 | $\nu_9$ | 56.4 | $L_9$ |
| $r_{15}$ | −20.68 | $d_{15}$ | 1.2 | $n_{10}$ | 1.796 | $\nu_{10}$ | 45.5 | $L_{10}$ |
| $r_{16}$ | −55.81 | $d_{16}$ | 0.1 | | | | | |
| $r_{17}$ | 25.11 | $d_{17}$ | 4.3 | $n_{11}$ | 1.514 | $\nu_{11}$ | 54.6 | $L_{11}$ |
| $r_{18}$ | 1029.84 | $d_{18}$ | 6.2 | | | | | |
| $r_{19}$ | −611.14 | $d_{19}$ | 3.0 | $n_{12}$ | 1.795 | $\nu_{12}$ | 28.5 | $L_{12}$ |
| $r_{20}$ | 38.31 | $d_{20}$ | 2.5 | | | | | |
| $r_{21}$ | −247.30 | $d_{21}$ | 3.3 | $n_{13}$ | 1.620 | $\nu_{13}$ | 60.2 | $L_{13}$ |
| $r_{22}$ | −27.81 | $d_{22}$ | 0.1 | | | | | |
| $r_{23}$ | 32.10 | $d_{23}$ | 8.2 | $n_{14}$ | 1.501 | $\nu_{14}$ | 56.4 | $L_{14}$ |
| $r_{24}$ | −17.98 | $d_{24}$ | 1.0 | $n_{15}$ | 1.796 | $\nu_{15}$ | 45.5 | $L_{15}$ |
| $r_{25}$ | −373.38 | | | | | | | |

(Group $G_3$ covers $L_9$ through $L_{15}$)

| | $F_W = 36$ | $F_M = 60$ | $F_T = 102.5$ |
|---|---|---|---|
| $d_5$ | 0.97 | 9.90 | 20.42 |
| $d_{13}$ | 20.57 | 11.73 | 3.44 |
| Stop, behind $L_8$ | 9.6 | 7.4 | 2.3 |
| Bf | 57.57 | 62.27 | 74.70 |

$V_2 = 2.024$

TABLE 3

(Third Embodiment)

Focal length F = 35~105, Zoom ratio 3, F-number 3.5~4.3, Image height y = 21.6

| | Radius of curvature | | Center thickness and air space | | Refractive index | | Abbe number | | |
|---|---|---|---|---|---|---|---|---|---|
| $r_1$ | 130.66 | $d_1$ | 1.3 | $n_1$ | 1.795 | $\nu_1$ | 28.5 | $L_1$ | |
| $r_2$ | 46.67 | $d_2$ | 1.0 | | | | | | |
| $r_3$ | 46.51 | $d_3$ | 8.5 | $n_2$ | 1.563 | $\nu_2$ | 60.8 | $L_2$ | $G_1$ |
| $r_4$ | −112.14 | $d_4$ | 0.1 | | | | | | |
| $r_5$ | 31.47 | $d_5$ | 4.0 | $n_3$ | 1.603 | $\nu_3$ | 60.6 | $L_3$ | |
| $r_6$ | 58.68 | $d_6$ | variable | | | | | | |
| $r_7$ | 62.48 | $d_7$ | 1.0 | $n_4$ | 1.796 | $\nu_4$ | 40.9 | $L_4$ | |
| $r_8$ | 15.51 | $d_8$ | 4.1 | | | | | | |
| $r_9$ | −172.67 | $d_9$ | 2.75 | $n_5$ | 1.795 | $\nu_5$ | 28.5 | $L_5$ | $G_2$ |
| $r_{10}$ | −25.48 | $d_{10}$ | 1.3 | $n_6$ | 1.796 | $\nu_6$ | 40.9 | $L_6$ | |
| $r_{11}$ | 272.88 | $d_{11}$ | 2.29 | | | | | | |
| $r_{12}$ | −16.25 | $d_{12}$ | 1.0 | $n_7$ | 1.582 | $\nu_7$ | 46.4 | $L_7$ | |
| $r_{13}$ | 32.07 | $d_{13}$ | 3.7 | $n_8$ | 1.795 | $\nu_8$ | 28.5 | $L_8$ | |
| $r_{14}$ | −40.23 | $d_{14}$ | variable | | | | | | |
| $r_{15}$ | 62.99 | $d_{15}$ | 5.5 | $n_9$ | 1.501 | $\nu_9$ | 56.4 | $L_9$ | |
| $r_{16}$ | −20.77 | $d_{16}$ | 1.2 | $n_{10}$ | 1.796 | $\nu_{10}$ | 45.5 | $L_{10}$ | |
| $r_{17}$ | −56.06 | $d_{17}$ | 0.1 | | | | | | |
| $r_{18}$ | 25.23 | $d_{18}$ | 4.3 | $n_{11}$ | 1.514 | $\nu_{11}$ | 54.6 | $L_{11}$ | |
| $r_{19}$ | 1034.62 | $d_{19}$ | 6.9 | | | | | | |
| $r_{20}$ | −856.49 | $d_{20}$ | 1.5 | $n_{12}$ | 1.795 | $\nu_{12}$ | 28.5 | $L_{12}$ | $G_3$ |
| $r_{21}$ | 38.01 | $d_{21}$ | 2.59 | | | | | | |
| $r_{22}$ | −851.48 | $d_{22}$ | 4.0 | $n_{13}$ | 1.620 | $\nu_{13}$ | 60.2 | $L_{13}$ | |
| $r_{23}$ | −29.36 | $d_{23}$ | 0.16 | | | | | | |
| $r_{24}$ | 32.76 | $d_{24}$ | 8.2 | $n_{14}$ | 1.501 | $\nu_{14}$ | 56.4 | $L_{14}$ | |
| $r_{25}$ | −18.36 | $d_{25}$ | 1.0 | $n_{15}$ | 1.796 | $\nu_{15}$ | 45.5 | $L_{15}$ | |
| $r_{26}$ | −678.32 | | | | | | | | |

| | $F_W = 36.2$ | $F_M = 60$ | $F_T = 102.5$ |
|---|---|---|---|
| $d_6$ | 1.04 | 9.96 | 18.64 |
| $d_{14}$ | 21.05 | 12.11 | 3.45 |
| Stop, behind $L_8$ | 10.0 | 6.1 | 2.1 |
| Bf | 57.37 | 68.90 | 79.79 |

$\nu_2 = 1.857$

TABLE 4

(Fourth Embodiment)

Focal length F = 35~105, Zoom ratio 3, F-number 3.5~4.5, Image height y = 21.6

| | Radius of curvature | | Center thickness and air space | Refractive index | | Abbe number | | | |
|---|---|---|---|---|---|---|---|---|---|
| $r_1$ | 163.84 | $d_1$ | 1.3 | $n_1$ | 1.805 | $\nu_1$ | 25.3 | $L_1$ | |
| $r_2$ | 60.38 | $d_2$ | 0.6 | | | | | | |
| $r_3$ | 69.92 | $d_3$ | 6.2 | $n_2$ | 1.603 | $\nu_2$ | 60.6 | $L_2$ | $G_1$ |
| $r_4$ | −124.35 | $d_4$ | 0.1 | | | | | | |
| $r_5$ | 32.82 | $d_5$ | 3.9 | $n_3$ | 1.603 | $\nu_3$ | 60.6 | $L_3$ | |
| $r_6$ | 67.73 | $d_6$ | variable | | | | | | |
| $r_7$ | 58.60 | $d_7$ | 1.0 | $n_4$ | 1.796 | $\nu_4$ | 45.5 | $L_4$ | |
| $r_8$ | 17.03 | $d_8$ | 3.0 | | | | | | |
| $r_9$ | −207.96 | $d_9$ | 3.5 | $n_5$ | 1.805 | $\nu_5$ | 25.3 | $L_5$ | |
| $r_{10}$ | −20.31 | $d_{10}$ | 1.0 | $n_6$ | 1.796 | $\nu_6$ | 45.5 | $L_6$ | $G_2$ |
| $r_{11}$ | −187.13 | $d_{11}$ | 2.7 | | | | | | |
| $r_{12}$ | −21.24 | $d_{12}$ | 1.0 | $n_7$ | 1.713 | $\nu_7$ | 53.9 | $L_7$ | |
| $r_{13}$ | 17.22 | $d_{13}$ | 3.3 | $n_8$ | 1.796 | $\nu_8$ | 40.9 | $L_8$ | |
| $r_{14}$ | −1098.84 | $d_{14}$ | variable | | | | | | |
| $r_{15}$ | 76.43 | $d_{15}$ | 4.0 | $n_9$ | 1.713 | $\nu_9$ | 53.9 | $L_9$ | |
| $r_{16}$ | −25.73 | $d_{16}$ | 0.5 | | | | | | |
| $r_{17}$ | −21.84 | $d_{17}$ | 1.0 | $n_{10}$ | 1.805 | $\nu_{10}$ | 25.3 | $L_{10}$ | $G_{31}$ |
| $r_{18}$ | −39.02 | $d_{18}$ | 0.1 | | | | | | |
| $r_{19}$ | 34.55 | $d_{19}$ | 2.0 | $n_{11}$ | 1.568 | $\nu_{11}$ | 56.0 | $L_{11}$ | |
| $r_{20}$ | 53.69 | $d_{20}$ | variable | | | | | | |
| $r_{21}$ | 29.35 | $d_{21}$ | 4.5 | $n_{12}$ | 1.563 | $\nu_{12}$ | 60.8 | $L_{12}$ | |
| $r_{22}$ | −45.83 | $d_{22}$ | 1.9 | | | | | | |
| $r_{23}$ | −41.49 | $d_{23}$ | 1.5 | $n_{13}$ | 1.796 | $\nu_{13}$ | 45.5 | $L_{13}$ | |
| $r_{24}$ | 29.65 | $d_{24}$ | 2.0 | | | | | | $G_3$ |
| $r_{25}$ | 994.65 | $d_{25}$ | 2.5 | $n_{14}$ | 1.516 | $\nu_{14}$ | 64.1 | $L_{14}$ | $G_{32}$ |
| $r_{26}$ | −38.85 | $d_{26}$ | 0.1 | | | | | | |
| $r_{27}$ | 857.81 | $d_{27}$ | 5.0 | $n_{15}$ | 1.516 | $\nu_{15}$ | 64.1 | $L_{15}$ | |
| $r_{28}$ | −25.42 | $d_{28}$ | 0.6 | | | | | | |
| $r_{29}$ | −21.42 | $d_{29}$ | 1.4 | $n_{16}$ | 1.749 | $\nu_{16}$ | 35.1 | $L_{16}$ | |
| $r_{30}$ | −29.07 | | | | | | | | |

| | $F_W = 36.2$ | $F_M = 60$ | $F_T = 103$ |
|---|---|---|---|
| $d_6$ | 1.28 | 10.99 | 20.32 |
| $d_{14}$ | 13.0 | 7.17 | 1.72 |
| $d_{20}$ | 9.66 | 5.79 | 1.91 |
| Stop, ahead of $L_9$ | 0.8 | 0.8 | 0.8 |

TABLE 4-continued (Fourth Embodiment)

| | | | |
|---|---|---|---|
| Bf | 52.04 | 64.97 | 77.87 |
| | $v_2 = 1.817$ | | |

TABLE 5

(Fifth Embodiment)

Focal length F = 35~105, Zoom ratio 3, F-number 3.5~4.5, Image height y = 21.6

| | Radius of curvature | Center thickness and air space | | Refractive index | | Abbe number | | | |
|---|---|---|---|---|---|---|---|---|---|
| $r_1$ | 146.56 | $d_1$ | 1.3 | $n_1$ | 1.805 | $v_1$ | 25.3 | $L_1$ | ⎫ |
| $r_2$ | 58.02 | $d_2$ | 0.8 | | | | | | |
| $r_3$ | 63.36 | $d_3$ | 6.2 | $n_2$ | 1.603 | $v_2$ | 60.6 | $L_2$ | ⎬ $G_1$ |
| $r_4$ | −138.23 | $d_4$ | 0.1 | | | | | | |
| $r_5$ | 33.60 | $d_5$ | 3.9 | $n_3$ | 1.603 | $v_3$ | 60.6 | $L_3$ | ⎭ |
| $r_6$ | 67.70 | $d_6$ | variable | | | | | | |
| $r_7$ | 62.53 | $d_7$ | 1.0 | $n_4$ | 1.796 | $v_4$ | 45.5 | $L_4$ | ⎫ |
| $r_8$ | 17.12 | $d_8$ | 3.0 | | | | | | |
| $r_9$ | −208.23 | $d_9$ | 3.5 | $n_5$ | 1.805 | $v_5$ | 25.3 | $L_5$ | |
| $r_{10}$ | −20.51 | $d_{10}$ | 1.0 | $n_6$ | 1.796 | $v_6$ | 45.5 | $L_6$ | ⎬ $G_2$ |
| $r_{11}$ | −177.01 | $d_{11}$ | 2.7 | | | | | | |
| $r_{12}$ | −21.42 | $d_{12}$ | 1.0 | $n_7$ | 1.713 | $v_7$ | 53.9 | $L_7$ | |
| $r_{13}$ | 17.19 | $d_{13}$ | 3.3 | $n_8$ | 1.796 | $v_8$ | 40.9 | $L_8$ | ⎭ |
| $r_{14}$ | −975.69 | $d_{14}$ | variable | | | | | | |
| $r_{15}$ | 87.95 | $d_{15}$ | 4.0 | $n_9$ | 1.713 | $v_9$ | 53.9 | $L_9$ | ⎫ |
| $r_{16}$ | −23.88 | $d_{16}$ | 1.11 | | | | | | |
| $r_{17}$ | −20.25 | $d_{17}$ | 1.0 | $n_{10}$ | 1.805 | $v_{10}$ | 25.3 | $L_{10}$ | ⎬ $G_{31}$ |
| $r_{18}$ | −35.29 | $d_{18}$ | 1.04 | | | | | | |
| $r_{19}$ | 28.82 | $d_{19}$ | 2.0 | $n_{11}$ | 1.568 | $v_{11}$ | 56.0 | $L_{11}$ | ⎭ |
| $r_{20}$ | 39.06 | $d_{20}$ | variable | | | | | | ⎫ |
| $r_{21}$ | 25.36 | $d_{21}$ | 4.0 | $n_{12}$ | 1.563 | $v_{12}$ | 60.8 | $L_{12}$ | |
| $r_{22}$ | −62.61 | $d_{22}$ | 1.87 | | | | | | |
| $r_{23}$ | −52.01 | $d_{23}$ | 1.0 | $n_{13}$ | 1.796 | $v_{13}$ | 45.5 | $L_{13}$ | ⎬ $G_3$ |
| $r_{24}$ | 26.06 | $d_{24}$ | 2.73 | | | | | $G_{32}$ | |
| $r_{25}$ | −77.80 | $d_{25}$ | 2.0 | $n_{14}$ | 1.518 | $v_{14}$ | 60.3 | $L_{14}$ | |
| $r_{26}$ | −26.94 | $d_{26}$ | 0.1 | | | | | | |
| $r_{27}$ | 86.70 | $d_{27}$ | 4.5 | $n_{15}$ | 1.563 | $v_{15}$ | 60.8 | $L_{15}$ | |
| $r_{28}$ | −25.30 | $d_{28}$ | 1.0 | $n_{16}$ | 1.796 | $v_{16}$ | 40.9 | $L_{16}$ | ⎭ |
| $r_{29}$ | −51.69 | | | | | | | | |

| | $F_W = 36.2$ | $F_M = 60$ | $F_T = 103$ |
|---|---|---|---|
| $d_6$ | 1.20 | 10.91 | 20.23 |
| $d_{14}$ | 13.06 | 7.22 | 1.77 |
| $d_{20}$ | 9.18 | 5.30 | 1.43 |
| Stop, ahead of $L_9$ | 0.8 | 0.8 | 0.8 |
| Bf | 52.77 | 65.70 | 78.60 |
| | $v_2 = 1.817$ | | |

TABLE 6

(Sixth Embodiment)

Focal length F = 35~105, Zoom ratio 3, F-number 3.5~4
Image height y = 21.6

| | Radius of curvature | Center thickness and air space | | Refractive index | | Abbe number | | | |
|---|---|---|---|---|---|---|---|---|---|
| $r_1$ | 157.33 | $d_1$ | 1.3 | $n_1$ | 1.805 | $v_1$ | 25.3 | $L_1$ | ⎫ |
| $r_2$ | 59.72 | $d_2$ | 0.6 | | | | | | |
| $r_3$ | 67.46 | $d_3$ | 6.2 | $n_2$ | 1.603 | $v_2$ | 60.6 | $L_2$ | ⎬ $G_1$ |
| $r_4$ | −130.89 | $d_4$ | 0.1 | | | | | | |
| $r_5$ | 33.37 | $d_5$ | 3.9 | $n_3$ | 1.603 | $v_3$ | 60.6 | $L_3$ | ⎭ |
| $r_6$ | 69.37 | $d_6$ | variable | | | | | | |
| $r_7$ | 63.56 | $d_7$ | 1.0 | $n_4$ | 1.796 | $v_4$ | 45.5 | $L_4$ | |
| $r_8$ | 17.11 | $d_8$ | 3.0 | | | | | | |
| $r_9$ | −204.46 | $d_9$ | 3.5 | $n_5$ | 1.805 | $v_5$ | 25.3 | $L_5$ | ⎫ |
| $r_{10}$ | −20.33 | $d_{10}$ | 1.0 | $n_6$ | 1.796 | $v_6$ | 45.5 | $L_6$ | ⎬ $G_2$ |
| $r_{11}$ | −192.0 | $d_{11}$ | 2.7 | | | | | | |
| $r_{12}$ | −21.45 | $d_{12}$ | 1.0 | $n_7$ | 1.713 | $v_7$ | 53.9 | $L_7$ | |
| $r_{13}$ | 17.47 | $d_{13}$ | 3.3 | $n_8$ | 1.796 | $v_8$ | 40.9 | $L_8$ | |
| $r_{14}$ | −568.20 | $d_{14}$ | variable | | | | | | |
| $r_{15}$ | 88.81 | $d_{15}$ | 4.0 | $n_9$ | 1.713 | $v_8$ | 53.9 | $L_9$ | ⎫ |
| $r_{16}$ | −25.60 | $d_{16}$ | 0.5 | | | | | | |
| $r_{17}$ | −21.70 | $d_{17}$ | 1.0 | $n_{10}$ | 1.805 | $v_{10}$ | 25.3 | $L_{10}$ | ⎬ $G_3$ |
| $r_{18}$ | −38.63 | $d_{18}$ | 0.1 | | | | | | |
| $r_{19}$ | 35.59 | $d_{19}$ | 2.0 | $n_{11}$ | 1.568 | $v_{11}$ | 56.0 | $L_{11}$ | ⎭ |
| $r_{20}$ | 64.42 | $d_{20}$ | variable | | | | | | ⎫ $G_3$ |
| $r_{21}$ | 23.62 | $d_{21}$ | 5.0 | $n_{12}$ | 1.563 | $v_{12}$ | 60.8 | $L_{12}$ | |

TABLE 6-continued (Sixth Embodiment)

| | | | | | | | |
|---|---|---|---|---|---|---|---|
| $r_{22}$ | 94.99 | $d_{22}$ | 1.5 | $n_{13}$ 1.796 | $v_{13}$ 45.5 | $L_{13}$ | |
| $r_{23}$ | 22.35 | $d_{23}$ | 2.0 | | | | |
| $r_{24}$ | 91.31 | $d_{24}$ | 3.0 | $n_{14}$ 1.516 | $v_{14}$ 64.1 | $L_{14}$ | $G_{32}$ |
| $r_{25}$ | −36.06 | $d_{25}$ | 0.1 | | | | |
| $r_{26}$ | −132.82 | $d_{26}$ | 5.0 | $n_{15}$ 1.518 | $v_{15}$ 60.3 | $L_{15}$ | |
| $r_{27}$ | −24.13 | $d_{27}$ | 0.6 | | | | |
| $r_{28}$ | −21.25 | $d_{28}$ | 1.4 | $n_{16}$ 1.749 | $v_{16}$ 35.1 | $L_{16}$ | |
| $r_{29}$ | −39.27 | | | | | | |

| | $F_W = 36.2$ | $F_M = 60$ | $F_T = 103$ |
|---|---|---|---|
| $d_6$ | 1.51 | 11.04 | 20.26 |
| $d_{14}$ | 12.49 | 6.75 | 1.38 |
| $d_{20}$ | 10.11 | 6.3 | 2.46 |
| Stop, ahead of $L_9$ | 0.8 | 0.8 | 0.8 |
| Bf | 51.01 | 63.68 | 76.50 |
| | $V_2 = 1.817$ | | |

TABLE 7

(Seventh Embodiment)

Focal length F = 35~105, Zoom ratio 3, F-number 3.5~4.5, Image height y = 21.6

| | Radius of curvature | | Center thickness and air space | | Refractive index | | Abbe number | | | |
|---|---|---|---|---|---|---|---|---|---|---|
| $r_1$ | 150.69 | $d_1$ | 1.3 | $n_1$ | 1.805 | $v_1$ | 25.3 | $L_1$ | | |
| $r_2$ | 58.13 | $d_2$ | 0.4 | | | | | | | |
| $r_3$ | 66.23 | $d_3$ | 6.2 | $n_2$ | 1.603 | $v_2$ | 60.6 | $L_2$ | | $G_1$ |
| $r_4$ | −128.09 | $d_4$ | 0.1 | | | | | | | |
| $r_5$ | 33.14 | $d_5$ | 3.9 | $n_3$ | 1.603 | $v_3$ | 60.6 | $L_3$ | | |
| $r_6$ | 67.54 | $d_6$ | variable | | | | | | | |
| $r_7$ | 62.79 | $d_7$ | 1.0 | $n_4$ | 1.796 | $v_4$ | 45.5 | $L_4$ | | |
| $r_8$ | 17.07 | $d_8$ | 3.0 | | | | | | | |
| $r_9$ | −213.87 | $d_9$ | 1.0 | $n_5$ | 1.805 | $v_5$ | 25.3 | $L_5$ | | |
| $r_{10}$ | −20.49 | $d_{10}$ | 1.0 | $n_6$ | 1.796 | $v_6$ | 45.5 | $L_6$ | | $G_2$ |
| $r_{11}$ | −194.15 | $d_{11}$ | 2.7 | | | | | | | |
| $r_{12}$ | −21.48 | $d_{12}$ | 1.0 | $n_7$ | 1.713 | $v_7$ | 53.9 | $L_7$ | | |
| $r_{13}$ | 17.23 | $d_{13}$ | 3.5 | $n_8$ | 1.796 | $v_8$ | 40.9 | $L_8$ | | |
| $r_{14}$ | −696.58 | $d_{14}$ | variable | | | | | | | |
| $r_{15}$ | 122.05 | $d_{15}$ | 4.0 | $n_9$ | 1.713 | $v_9$ | 53.9 | $L_9$ | | |
| $r_{16}$ | −24.80 | $d_{16}$ | 0.4 | | | | | | | |
| $r_{17}$ | −21.54 | $d_{17}$ | 1.0 | $n_{10}$ | 1.805 | $v_{10}$ | 25.3 | $L_{10}$ | $G_{31}$ | |
| $r_{18}$ | −38.91 | $d_{18}$ | 0.1 | | | | | | | |
| $r_{19}$ | 35.07 | $d_{19}$ | 2.0 | $n_{11}$ | 1.568 | $v_{11}$ | 56.0 | $L_{11}$ | | $G_3$ |
| $r_{20}$ | 72.08 | $d_{20}$ | variable | | | | | | | |
| $r_{21}$ | 21.96 | $d_{21}$ | 4.0 | $n_{12}$ | 1.563 | $v_{12}$ | 60.8 | $L_{12}$ | | |
| $r_{22}$ | 34.58 | $d_{22}$ | 1.5 | $n_{13}$ | 1.796 | $v_{13}$ | 45.5 | $L_{13}$ | | |
| $r_{23}$ | 20.50 | $d_{23}$ | 2.0 | | | | | | | |
| $r_{24}$ | 104.25 | $d_{24}$ | 4.0 | $n_{14}$ | 1.518 | $v_{14}$ | 60.3 | $L_{14}$ | $G_{32}$ | |
| $r_{25}$ | −31.38 | $d_{25}$ | 0.1 | | | | | | | |
| $r_{26}$ | −95.95 | $d_{26}$ | 5.5 | $n_{15}$ | 1.563 | $v_{15}$ | 60.8 | $L_{15}$ | | |
| $r_{27}$ | −16.37 | $d_{27}$ | 1.4 | $n_{16}$ | 1.796 | $v_{16}$ | 40.9 | $L_{16}$ | | |
| $r_{28}$ | −45.88 | | | | | | | | | |

| | $F_W = 36.2$ | $F_M = 60$ | $F_T = 103$ |
|---|---|---|---|
| $d_6$ | 0.98 | 10.62 | 19.77 |
| $d_{14}$ | 12.52 | 6.77 | 1.49 |
| $d_{20}$ | 10.84 | 6.96 | 3.08 |
| Stop, ahead of $L_9$ | 0.8 | 0.8 | 0.8 |
| Bf | 52.36 | 65.30 | 78.24 |
| | $V_2 = 1.817$ | | |

Figure 15:
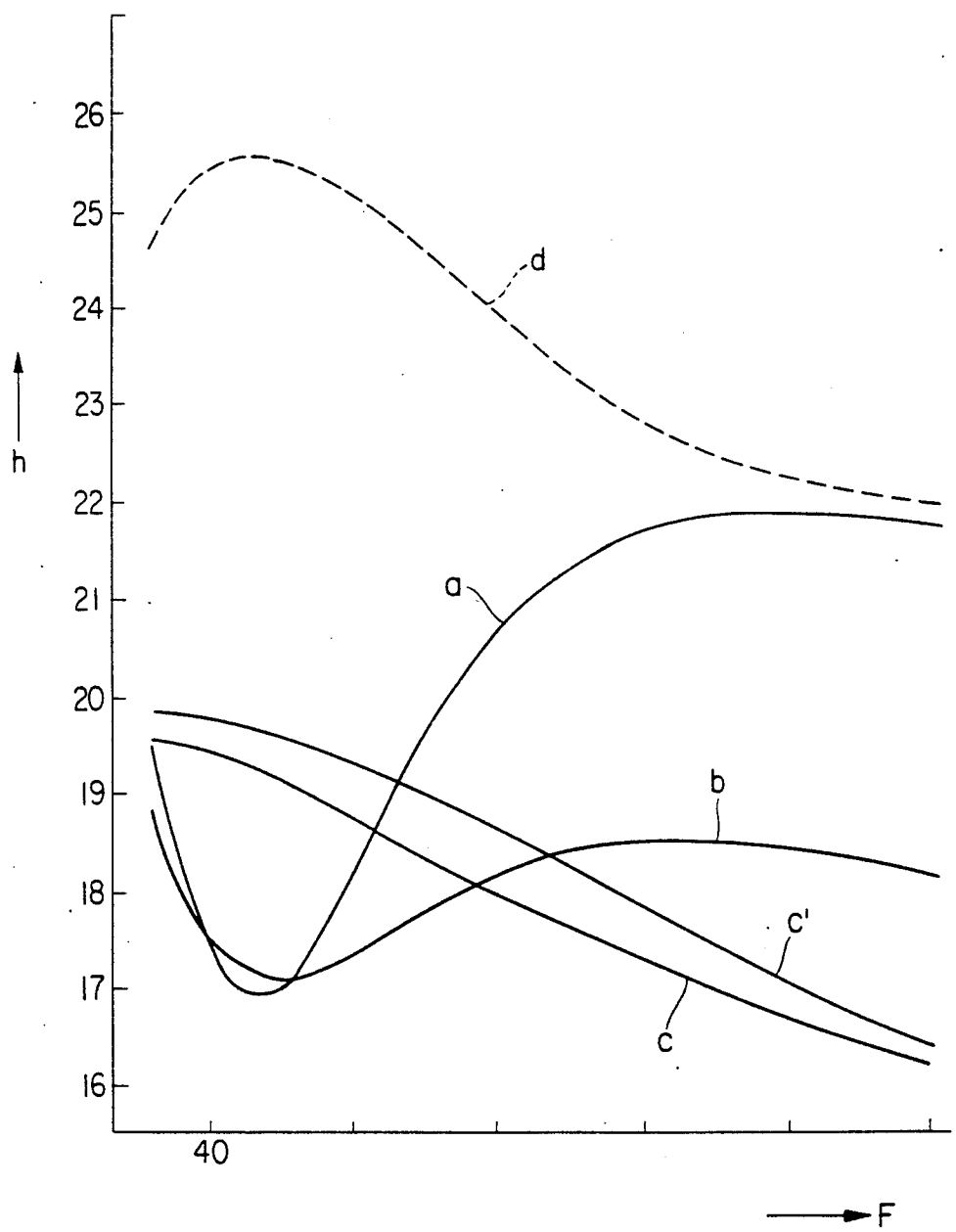
FIG. 15 is a graph showing the effect of each embodiment.
Figure 16A:
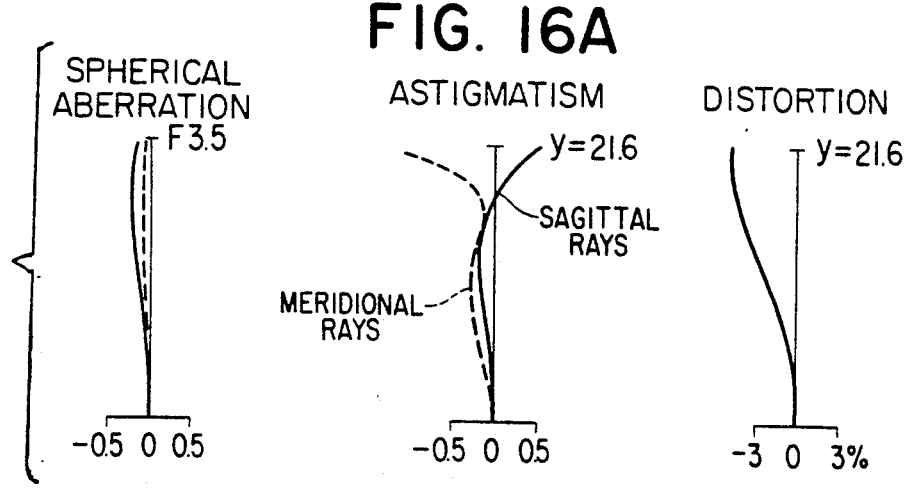
Figure 16B:
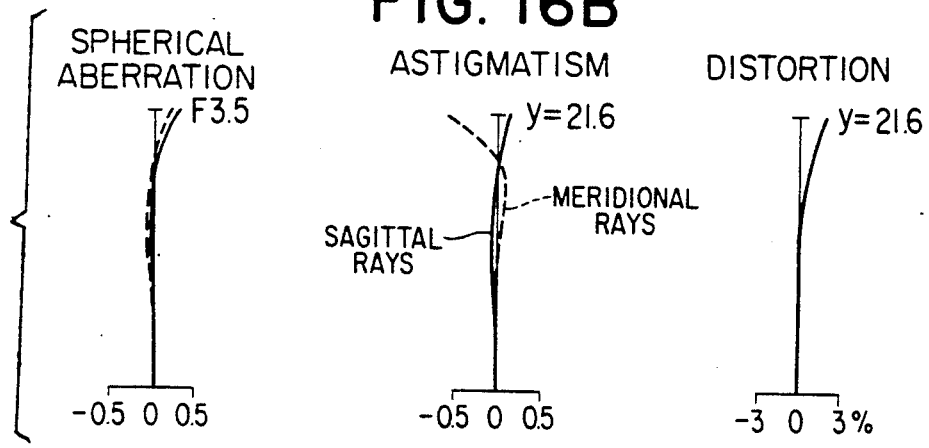
Figure 16C:
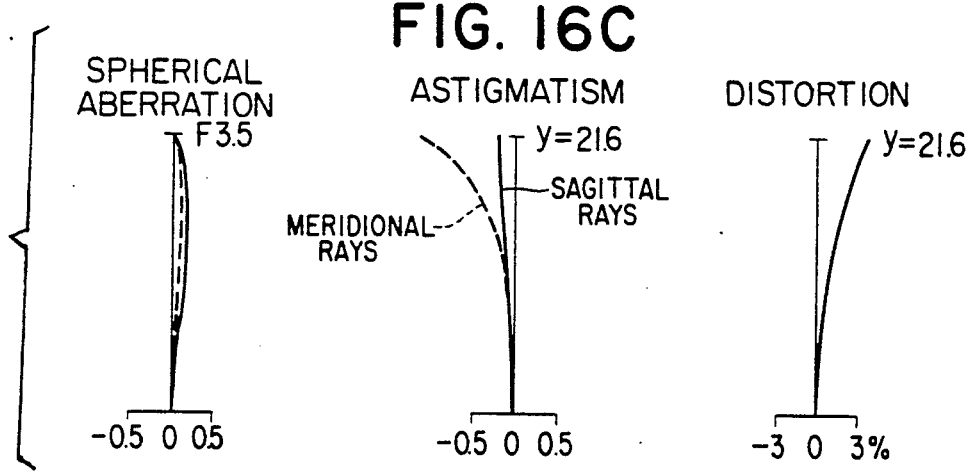
Figure 17A:
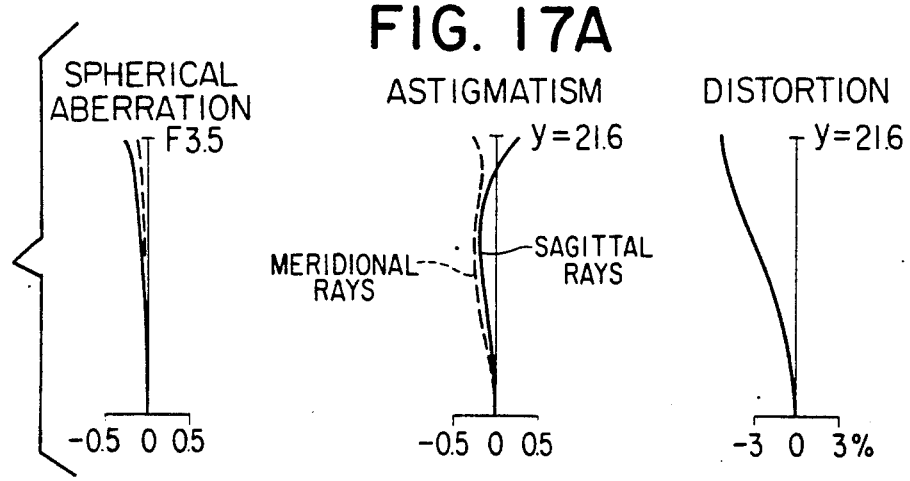
Figure 17B:
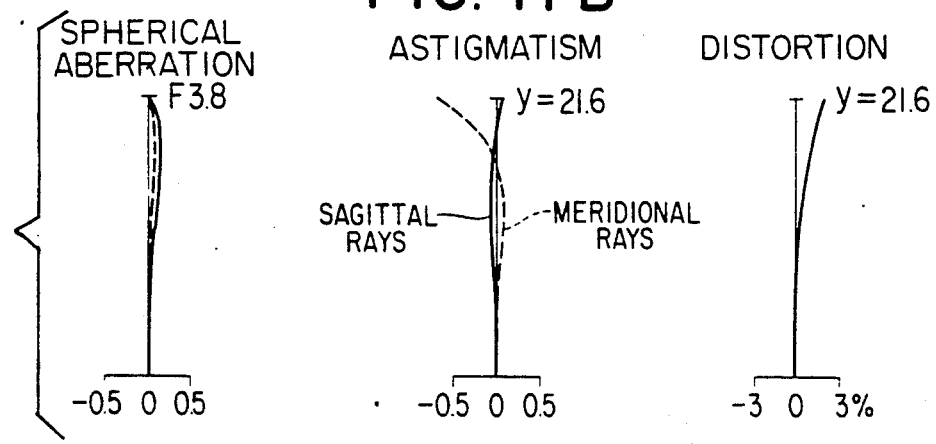
Figure 17C:
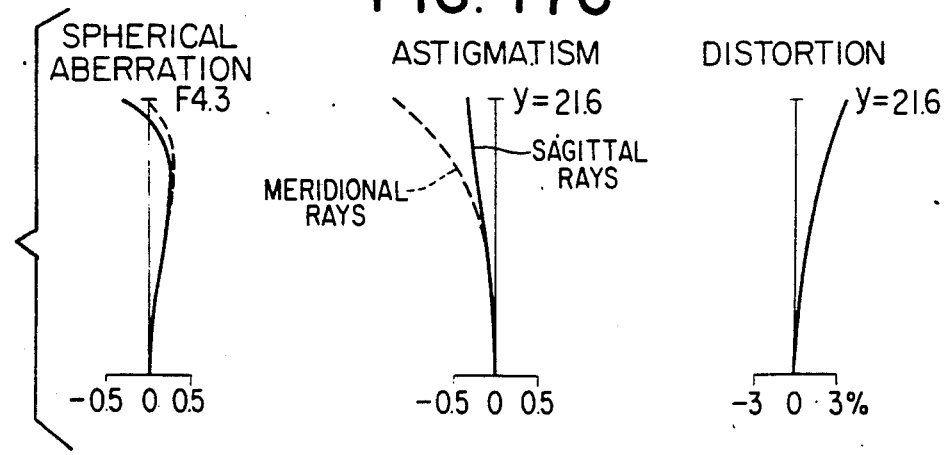
Figure 18A:
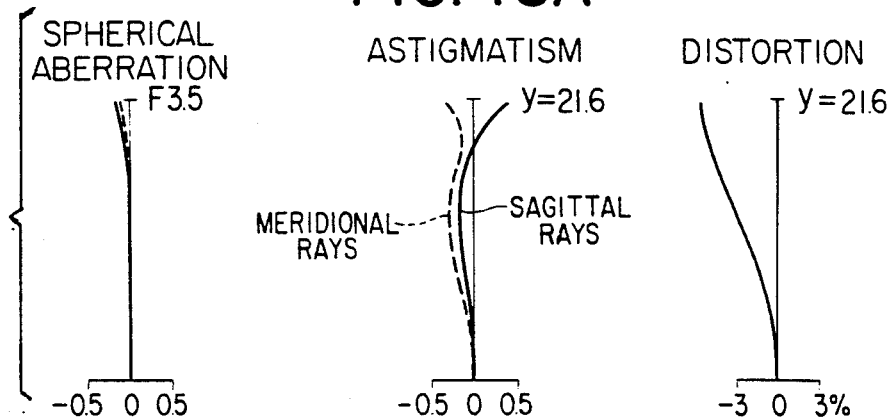
Figure 18B:
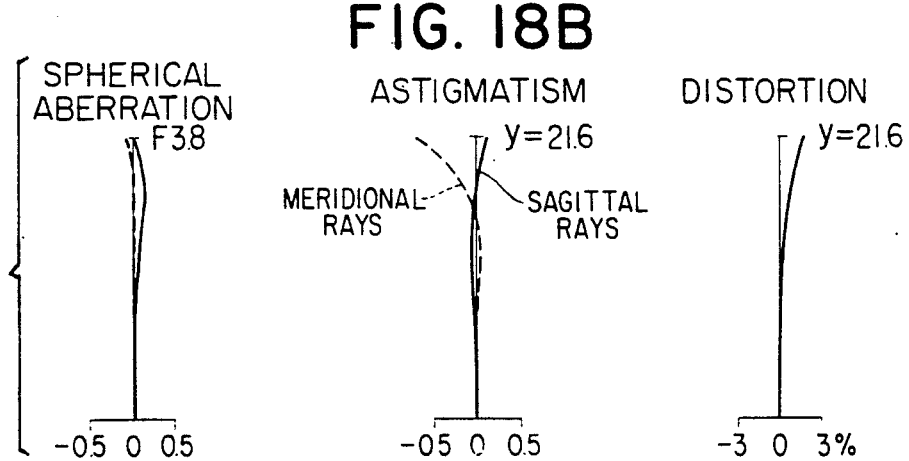
Figure 18C:
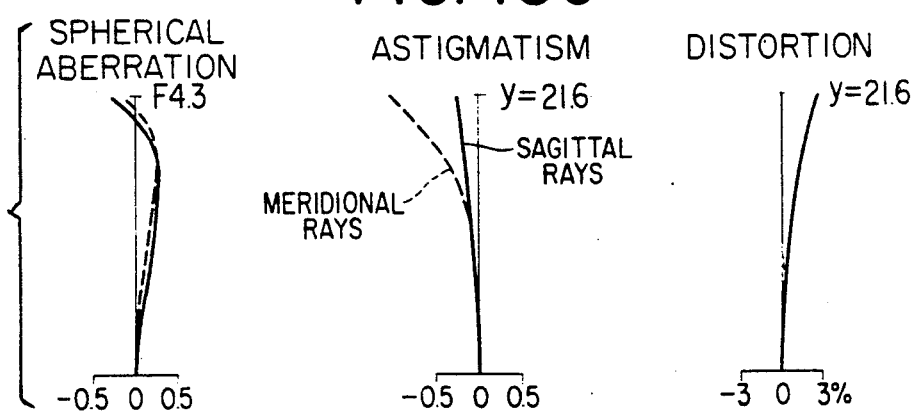
Figure 19A:
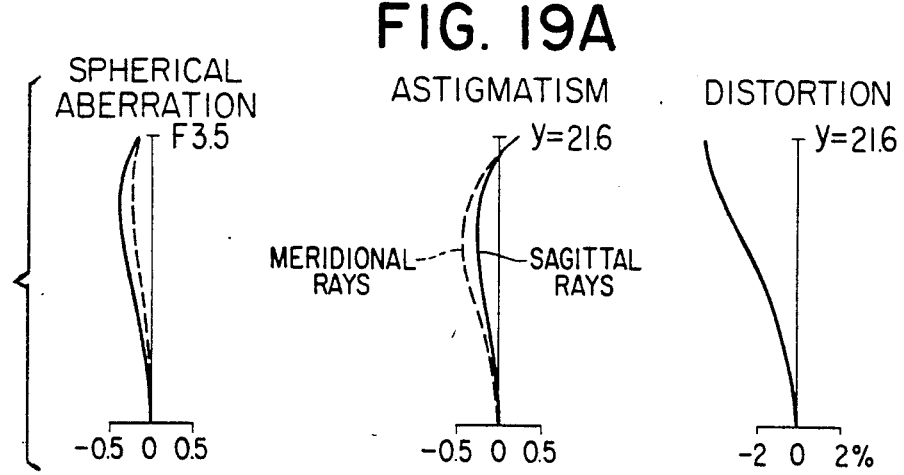
Figure 19B:
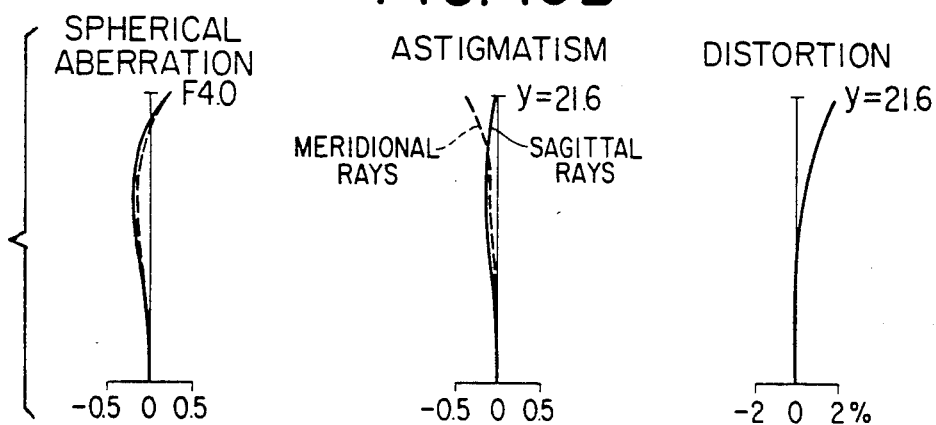
Figure 19C:
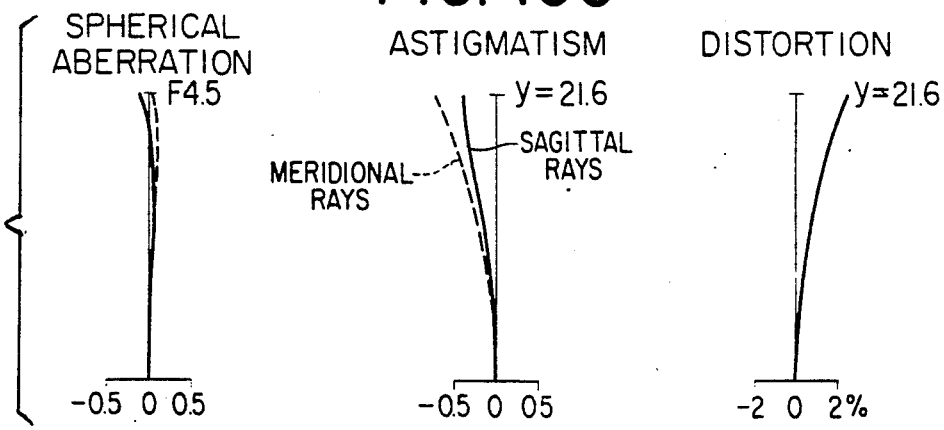
Figure 20A:
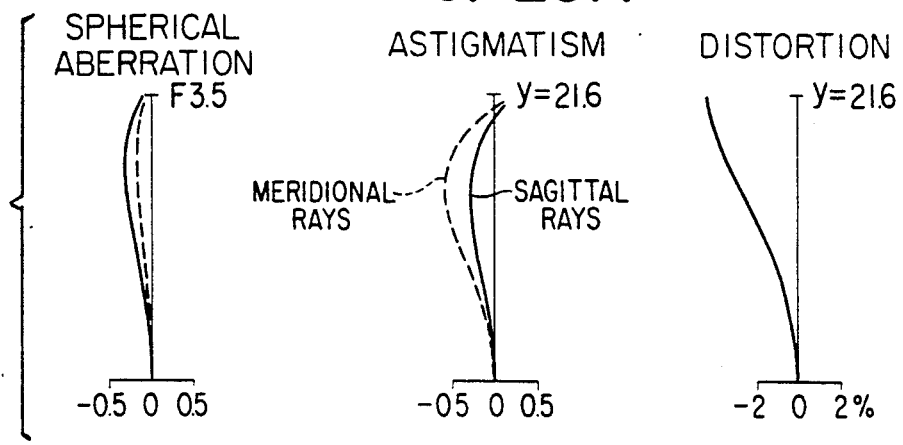
Figure 20B:
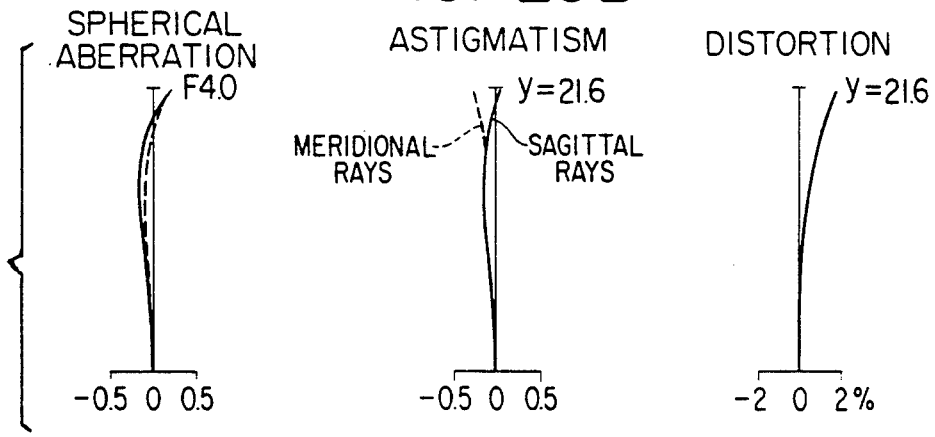
Figure 20C:
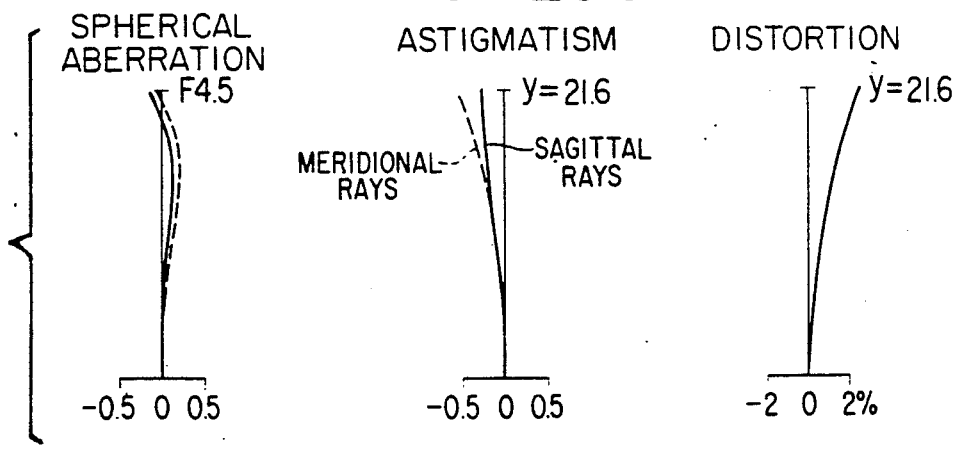
Figure 21A:
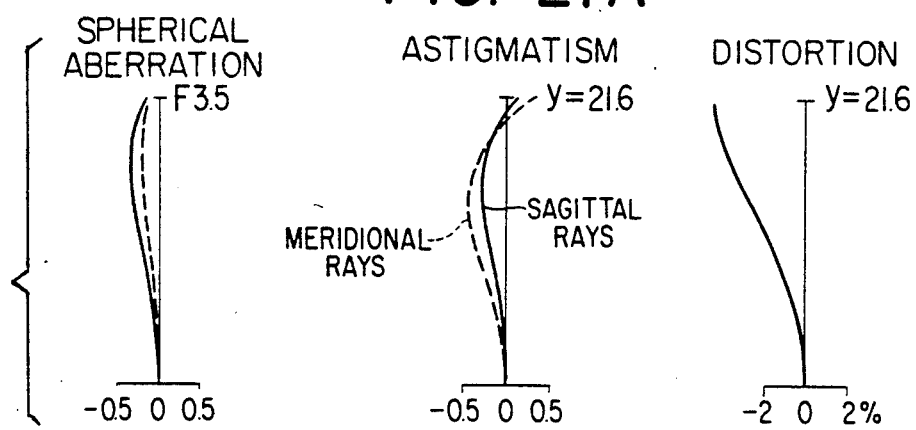
Figure 21B:
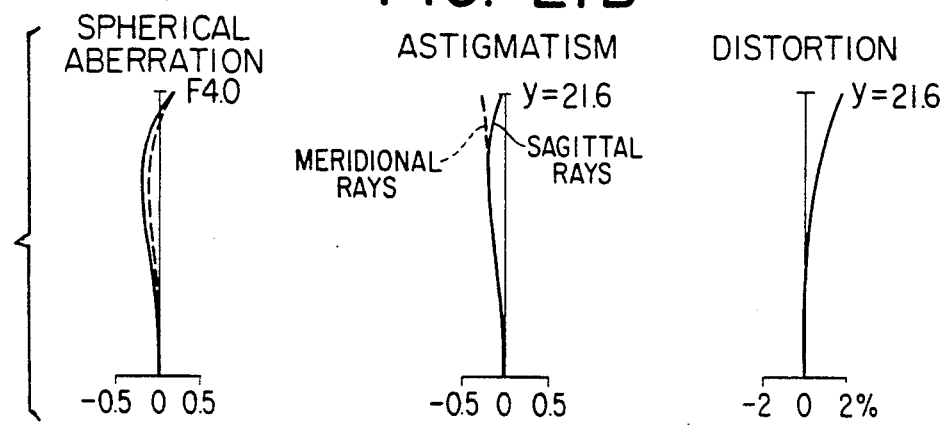
Figure 21C:
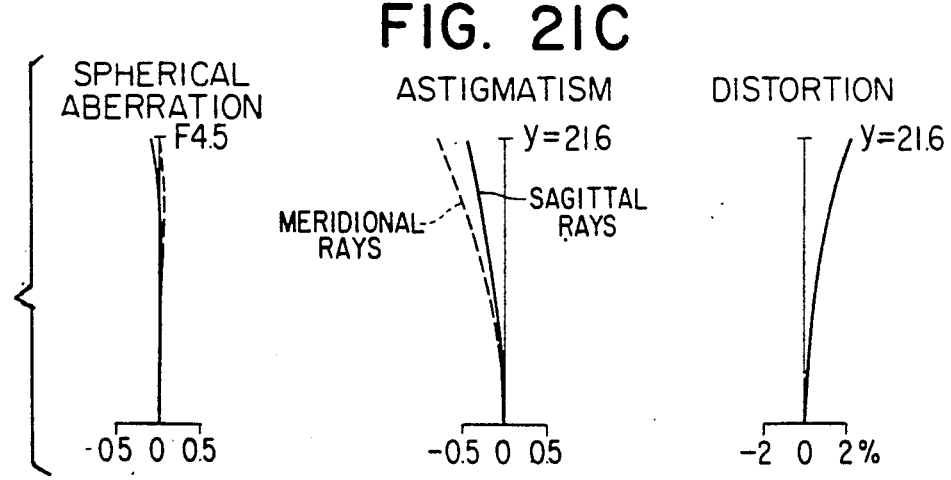
Figure 22A:
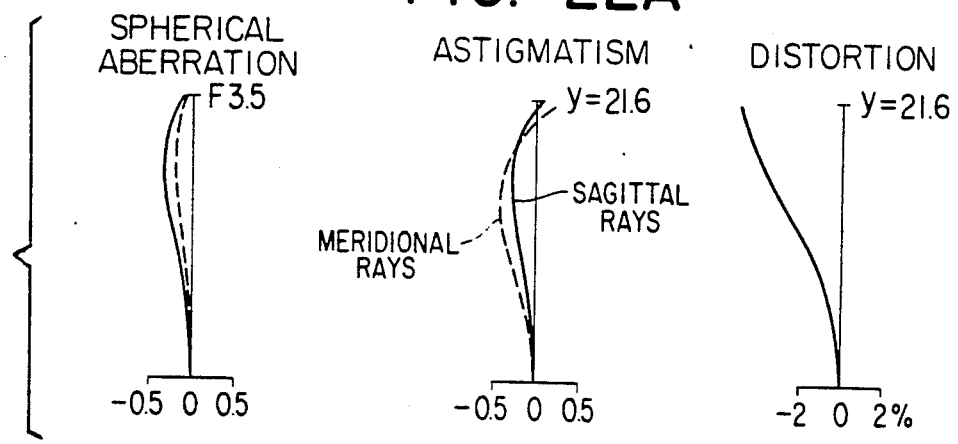
Figure 22B:
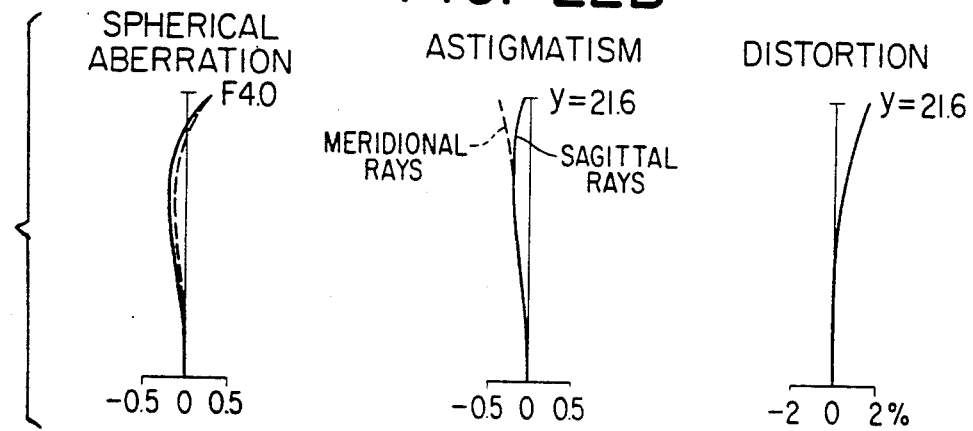
Figure 22C:
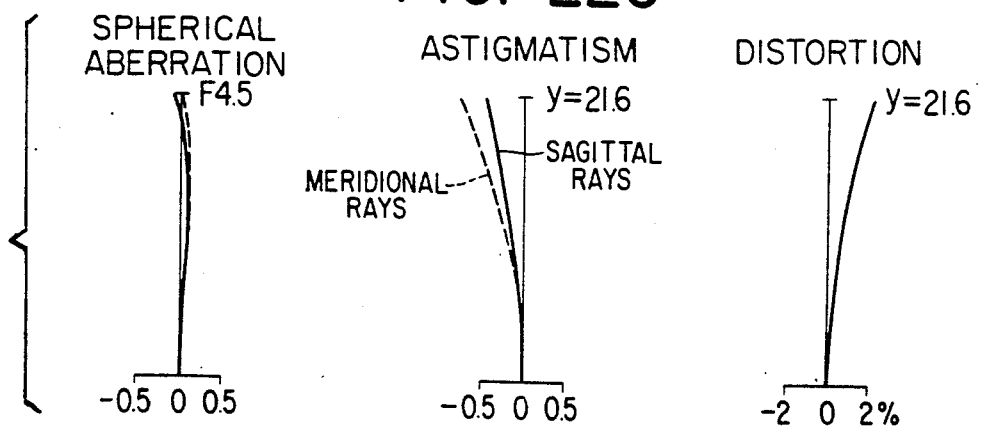

To show the effect of the present invention with respect to each of the above-described embodiments, FIG. 15 shows the way of variation in the height h, from the optical axis, of the position at which the principal light ray of a maximum angle of view passes through the first lens group when the lens system is focused to an object at a very short distance of 1.5 m, resulting from the variation in the focal length F in each embodiment. In FIG. 15, curve a refers to the first embodiment by the magnification changing system of type A, curve b refers to the second embodiment by the magnification changing system of type B, curve c refers to the third embodiment by the magnification changing system of type C, and curve c' refers to the fourth to seventh embodiments by the magnification changing system of type C in which the third group is constructed by being divided into two positive lens groups. In FIG. 15, dotted curve d refers to a three-group zoom lens disclosed in Japanese Laid-open Patent Application No. 1009/1981, for the purpose of comparison. As will be seen from this figure, in each embodiment, the position at which the principal light ray of a maximum angle of view passes through the first group is considerably near the optical axis and the aperture of the foremost lens can be made very small. In each embodiment, the diameter of the filter mounted most adjacent to the object side of the lens system is 52 mm which is considerably smaller than in the prior art and thus, the shape of the entire lens system can be made small.

The aberrations in the first to seventh embodiments are shown in FIGS. 16A–16C to 22A–22C, respectively. In each of these figures, A shows the shortest focal length condition as the wide angle end, B shows the intermediate focal length condition, and C shows the longest focal length condition as the telephoto end. In the graph of spherical aberration, the amount of contravention against the sine condition is also indicated by a dotted line. As will be seen from these figures, in each embodiment, an excellent imaging performance is maintained over the entire magnification change area.

As described above, according to the present invention, there is achieved a zoom lens which includes a wide angle in which the maximum angle of view exceeds 60° and has a magnification change rate as high as zoom ratio 3 for F-number 3.5 or so and yet has a front lens aperture as small as a filter aperture of 52 mm and which is small in shape of the entire lens and remarkably light in weight and moreover has an excellent imaging performance over the entire magnification change area.

We claim:

1. A zoom lens including a wide angle of view and consisting of, in succession from the object side, a first lens group of positive refractive power, a second lens group of negative refractive power and a third lens group of positive refractive power and capable of effecting magnification change by the second lens group being moved relative to the first and third lens groups, characterized in that when zooming is effected from the wide angle end to the telephoto end, said first lens group and said third lens group are monotonously moved toward the object side and said second lens group is moved toward the object side at least near the wide angle end so that the position at which the principal light ray of a maximum angle of view cuts said first lens group is nearer to the optical axis, whereby the aperture of said first lens group can be kept small.

2. A zoom lens according to claim 1, which satisfies the following condition:

$$0.5 < V_2/V < 0.9$$

where V is the zoom ratio by the entire lens system and $V_2$ is the ratio of the magnification at the wide angle end by said second lens group alone to the magnification at the telephoto end.

3. A zoom lens according to claim 1 which further comprises cam means rotatable to effect magnification change, said first, second and third lens groups being moved in accordance with the angle of the rotation of said cam means.

4. A zoom lens according to claim 3, wherein when magnification change is effected from the wide angle end toward the telephoto end by the rotation of said cam means, said first lens group is rectilinearly moved toward the object side, said second lens group has substantially the same positions at the wide angle end and the telephoto end relative to the image plane and is smoothly moved so as to lie most adjacent to the object side at the intermediate position, and said third lens group has the image plane correcting function and is monotonously moved toward the object side while depicting a non-linear locus having a point of inflection.

5. A zoom lens according to claim 3, wherein when magnification change is effected from the wide angle end to the telephoto end by the rotation of said cam means, said first lens group is rectilinearly moved toward the object side, said second lens group is monotonously moved toward the object side while depicting a non-linear locus and lies more adjacent to the object side at the telephoto end than at the wide angle end, and said third lens group is rectilinearly moved toward the object side at the same velocity as said first lens group.

6. A zoom lens according to claim 3, wherein when magnification change is effected from the wide angle end toward the telephoto end by the rotation of said cam means, said first lens group is rectilinearly moved toward the object side, said second lens group is monotonously moved toward the object side while depicting a non-linear locus and lies more adjacent to the object side at the telephoto end than at the wide angle end, said third lens group has a forward group of positive refractive power and a rearward group of positive refractive power, and said forward group and said rearward group are rectilinearly moved toward the object side at different velocities.

7. A zoom lens according to claim 6, wherein the movement velocity of said forward group in said third lens group is less than that of said rearward group and the ratio of the two velocities is in the range of 0.5:1.0–0.9:1.0.

8. A zoom lens according to claim 7, wherein said forward group in said third lens group has, in succession from the object side, a biconvex positive lens ($L_9$) having its surface of sharper curvature facing the image side, a negative meniscus lens ($L_{10}$) having its convex surface facing the image side, and a positive meniscus lens ($L_{11}$) having its convex surface facing the object side.

9. A zoom lens according to claim 8, wherein when the shape factors of the successive lenses of said forward group in said third lens group are $q_{10}$, $q_{11}$ and $g_{12}$, the following conditions are satisified:

$$0.3 < |q_9| < 1.0$$

$$2.0 < q_{10} < 5.0$$

$$3.0 < q_{11} < 8.0$$

where the shaper factor q is defined as $$q = \frac{R_2 + R_1}{R_2 - R_1}$$

where $R_1$ is the radius of curvature of the surface of each lens which is adjacent to the object side and $R_2$ is the radius of curvature of the surface of each lens which is adjacent to the image side.

10. A zoom lens according to claim 9, wherein said rearward group in said third lens group has, in succession from the object side, a biconvex positive lens ($L_{12}$), a biconcave lens ($L_{13}$), a positive lens ($L_{14}$) having its surface of shaper curvature facing the image side, a positive lens ($L_{15}$), and a negative meniscus lens ($L_{16}$) having its convex surface facing the image side.

11. A zoom lens according to claim 10, wherein numerical data are as follows:

| | Focal length F = 35~105, Zoom ratio 3, F-number 3.5~4.5, Image height y = 21.6 | | | | | | | | |
|---|---|---|---|---|---|---|---|---|---|
| | Radius of curvature | Center thickness and air space | | Refractive index | | Abbe number | | | |
| $r_1$ | 163.84 | $d_1$ | 1.3 | $n_1$ | 1.805 | $\nu_1$ | 25.3 | $L_1$ | ⎫ |
| $r_2$ | 60.38 | $d_2$ | 0.6 | | | | | | ⎪ |
| $r_3$ | 69.92 | $d_3$ | 6.2 | $n_2$ | 1.603 | $\nu_2$ | 60.6 | $L_2$ | $G_1$ |
| $r_4$ | −124.35 | $d_4$ | 0.1 | | | | | | ⎪ |
| $r_5$ | 32.82 | $d_5$ | 3.9 | $n_3$ | 1.603 | $\nu_3$ | 60.6 | $L_3$ | ⎭ |
| $r_6$ | 67.73 | $d_6$ | variable | | | | | | |
| $r_7$ | 58.60 | $d_7$ | 1.0 | $n_4$ | 1.796 | $\nu_4$ | 45.5 | $L_4$ | ⎫ |
| $r_8$ | 17.03 | $d_8$ | 3.0 | | | | | | ⎪ |
| $r_9$ | −207.96 | $d_9$ | 3.5 | $n_5$ | 1.805 | $\nu_5$ | 25.3 | $L_5$ | ⎪ |
| $r_{10}$ | −20.31 | $d_{10}$ | 1.0 | $n_6$ | 1.796 | $\nu_6$ | 45.5 | $L_6$ | $G_2$ |
| $r_{11}$ | −187.13 | $d_{11}$ | 2.7 | | | | | | ⎪ |
| $r_{12}$ | −21.24 | $d_{12}$ | 1.0 | $n_7$ | 1.713 | $\nu_7$ | 53.9 | $L_7$ | ⎪ |
| $r_{13}$ | 17.22 | $d_{13}$ | 3.3 | $n_8$ | 1.796 | $\nu_8$ | 40.9 | $L_8$ | ⎭ |
| $r_{14}$ | −1098.84 | $d_{14}$ | variable | | | | | | |
| $r_{15}$ | 76.43 | $d_{15}$ | 4.0 | $n_9$ | 1.713 | $\nu_9$ | 53.9 | $L_9$ | ⎫ |
| $r_{16}$ | −25.73 | $d_{16}$ | 0.5 | | | | | | ⎪ |
| $r_{17}$ | −21.84 | $d_{17}$ | 1.0 | $n_{10}$ | 1.805 | $\nu_{10}$ | 25.3 | $L_{10}$ | $G_{31}$ ⎫ |
| $r_{18}$ | −39.02 | $d_{18}$ | 0.1 | | | | | | ⎪ |
| $r_{19}$ | 34.55 | $d_{19}$ | 2.0 | $n_{11}$ | 1.568 | $\nu_{11}$ | 56.0 | $L_{11}$ | ⎭ ⎪ |
| $r_{20}$ | 53.69 | $d_{20}$ | variable | | | | | | ⎪ |
| $r_{21}$ | 29.35 | $d_{21}$ | 4.5 | $n_{12}$ | 1.563 | $\nu_{12}$ | 60.8 | $L_{12}$ | ⎫ $G_3$ |
| $r_{22}$ | −45.83 | $d_{22}$ | 1.9 | | | | | | ⎪ |
| $r_{23}$ | −41.49 | $d_{23}$ | 1.5 | $n_{13}$ | 1.796 | $\nu_{13}$ | 45.5 | $L_{13}$ | ⎪ |
| $r_{24}$ | 29.65 | $d_{24}$ | 2.0 | | | | | | ⎪ |
| $r_{25}$ | 994.65 | $d_{25}$ | 2.5 | $n_{14}$ | 1.516 | $\nu_{14}$ | 64.1 | $L_{14}$ | $G_{32}$ ⎪ |
| $r_{26}$ | −38.85 | $d_{26}$ | 0.1 | | | | | | ⎪ |
| $r_{27}$ | 857.81 | $d_{27}$ | 5.0 | $n_{15}$ | 1.516 | $\nu_{15}$ | 64.1 | $L_{15}$ | ⎪ |
| $r_{28}$ | −25.42 | $d_{28}$ | 0.6 | | | | | | ⎪ |
| $r_{29}$ | −21.42 | $d_{29}$ | 1.4 | $n_{16}$ | 1.749 | $\nu_{16}$ | 35.1 | $L_{16}$ | ⎭ |
| $r_{30}$ | −29.0 | | | | | | | | |

| | $F_W = 36.2$ | $F_M = 60$ | $F_T = 103$ |
|---|---|---|---|
| $d_6$ | 1.28 | 10.99 | 20.32 |
| $d_{14}$ | 13.0 | 7.17 | 1.72 |
| $d_{20}$ | 9.66 | 5.79 | 1.91 |
| Step, ahead of $L_9$ | 0.8 | 0.8 | 0.8 |
| Bf | 52.04 | 64.97 | 77.87 |
| | $\nu_2 = 1.817$ | | |

12. A zoom lens according to claim 10, wherein numerical data are as follows:

| | Focal length F = 35~105, Zoom ratio 3, F-number 3.5~4.5, Image height y = 21.6 | | | | | | | | |
|---|---|---|---|---|---|---|---|---|---|
| | Radius of curvature | Center thickness and air space | | Refractive index | | Abbe number | | | |
| $r_1$ | 146.56 | $d_1$ | 1.3 | $n_1$ | 1.805 | $\nu_1$ | 25.3 | $L_1$ | ⎫ |
| $r_2$ | 58.02 | $d_2$ | 0.8 | | | | | | ⎪ |
| $r_3$ | 63.36 | $d_3$ | 6.2 | $n_2$ | 1.603 | $\nu_2$ | 60.6 | $L_2$ | $G_1$ |
| $r_4$ | −138.23 | $d_4$ | 0.1 | | | | | | ⎪ |
| $r_5$ | 33.60 | $d_5$ | 3.9 | $n_3$ | 1.603 | $\nu_3$ | 60.6 | $L_3$ | ⎭ |
| $r_6$ | 67.70 | $d_6$ | variable | | | | | | |
| $r_7$ | 62.53 | $d_7$ | 1.0 | $n_4$ | 1.796 | $\nu_4$ | 45.5 | $L_4$ | ⎫ |
| $r_8$ | 17.12 | $d_8$ | 3.0 | | | | | | ⎪ |
| $r_9$ | −208.23 | $d_9$ | 3.5 | $n_5$ | 1.805 | $\nu_5$ | 25.3 | $L_5$ | ⎪ |
| $r_{10}$ | −20.51 | $d_{10}$ | 1.0 | $n_6$ | 1.796 | $\nu_6$ | 45.5 | $L_6$ | $G_2$ |
| $r_{11}$ | −177.01 | $d_{11}$ | 2.7 | | | | | | ⎪ |
| $r_{12}$ | −21.42 | $d_{12}$ | 1.0 | $n_7$ | 1.713 | $\nu_7$ | 53.9 | $L_7$ | ⎪ |
| $r_{13}$ | 17.19 | $d_{13}$ | 3.3 | $n_8$ | 1.796 | $\nu_8$ | 40.9 | $L_8$ | ⎭ |
| $r_{14}$ | −975.69 | $d_{14}$ | variable | | | | | | |
| $r_{15}$ | 87.95 | $d_{15}$ | 4.0 | $n_9$ | 1.713 | $\nu_9$ | 53.9 | $L_9$ | ⎫ |
| $r_{16}$ | −23.88 | $d_{16}$ | 1.11 | | | | | | ⎪ |
| $r_{17}$ | −20.25 | $d_{17}$ | 1.0 | $n_{10}$ | 1.805 | $\nu_{10}$ | 25.3 | $L_{10}$ | $G_{31}$ ⎫ |
| $r_{18}$ | −35.29 | $d_{18}$ | 1.04 | | | | | | ⎪ |
| $r_{19}$ | 28.82 | $d_{19}$ | 2.0 | $n_{11}$ | 1.568 | $\nu_{11}$ | 56.0 | $L_{11}$ | ⎭ ⎪ |
| $r_{20}$ | 39.06 | $d_{20}$ | variable | | | | | | ⎪ |
| $r_{21}$ | 25.36 | $d_{21}$ | 4.0 | $n_{12}$ | 1.563 | $\nu_{12}$ | 60.8 | $L_{12}$ | ⎫ $G_3$ |
| $r_{22}$ | −62.61 | $d_{22}$ | 1.87 | | | | | | ⎪ |
| $r_{23}$ | −52.01 | $d_{23}$ | 1.0 | $n_{13}$ | 1.796 | $\nu_{13}$ | 45.5 | $L_{13}$ | ⎪ |
| $r_{24}$ | 26.06 | $d_{24}$ | 2.73 | | | | | | $G_{32}$ ⎪ |
| $r_{25}$ | −77.80 | $d_{25}$ | 2.0 | $n_{14}$ | 1.518 | $\nu_{14}$ | 60.3 | $L_{14}$ | ⎪ |
| $r_{26}$ | −26.94 | $d_{26}$ | 0.1 | | | | | | ⎪ |
| $r_{27}$ | 86.70 | $d_{27}$ | 4.5 | $n_{15}$ | 1.563 | $\nu_{15}$ | 60.8 | $L_{15}$ | ⎪ |
| $r_{28}$ | −25.30 | $d_{28}$ | 1.0 | $n_{16}$ | 1.796 | $\nu_{16}$ | 40.9 | $L_{16}$ | ⎭ |

-continued r_{29}  −51.69

|  | $F_W = 36.2$ | $F_M = 60$ | $F_T = 103$ |
|---|---|---|---|
| $d_6$ | 1.20 | 10.91 | 20.23 |
| $d_{14}$ | 13.06 | 7.22 | 1.77 |
| $d_{20}$ | 9.18 | 5.30 | 1.43 |
| Stop, ahead of $L_9$ | 0.8 | 0.8 | 0.8 |
| Bf | 52.77 | 65.70 | 78.60 |
|  | $\nu_2 = 1.817$ | | |

13. A zoom lens according to claim 9, wherein said rearward group in said third lens group has, in succession from the object side, a positive meniscus lens ($L_{12}$) having its convex surface facing the object side, a negative miniscus lens ($L_{13}$) cemented thereto and having its convex surface facing the object side, a positive lens ($L_{14}$) having its surface of sharper curvature facing the image side, a positive lens ($L_{15}$) having its surface of sharper curvature facing the image side, and a negative meniscus lens $L_{16}$ cemented thereto or separated therefrom and having its convex surface facing the image side.

14. A zoom lens according to claim 13, which satisfies the following conditions:

$$0.2 < r_a/f_{32} < 0.4$$

$$0.2 < r_b/f_{32} < 0.4$$

where $f_{32}$ is the focal length of said rearward group in said third lens group, $r_a$ is the radius of curvature of the surface of said positive meniscus lens ($L_{12}$) which is adjacent to the object side, and $r_b$ is the radius of curvature of the surface of said negative meniscus lens ($L_{13}$) which is adjacent to the image side, said positive meniscus lens ($L_{12}$) and said negative meniscus lens ($L_{13}$) being cemented together.

15. A zoom lens according to claim 14, wherein numerical data are as follows:

| Focal length F = 35~105, Zoom ratio 3, F-number 3.5~4.5, Image height y = 21.6 | | | | | | | | |
|---|---|---|---|---|---|---|---|---|
| Radius of curvature | | Center thickness and air space | | Refractive index | | Abbe number | | |
| $r_1$ | 157.33 | $d_1$ | 1.3 | $n_1$ | 1.805 | $\nu_1$ | 25.3 | $L_1$ |
| $r_2$ | 59.72 | $d_2$ | 0.6 | | | | | |
| $r_3$ | 67.46 | $d_3$ | 6.2 | $n_2$ | 1.603 | $\nu_2$ | 60.6 | $L_2$ |
| $r_4$ | −130.89 | $d_4$ | 0.1 | | | | | |
| $r_5$ | 33.37 | $d_5$ | 3.9 | $n_3$ | 1.603 | $\nu_3$ | 60.6 | $L_3$ |
| $r_6$ | 69.37 | $d_6$ | variable | | | | | |
| $r_7$ | 63.56 | $d_7$ | 1.0 | $n_4$ | 1.796 | $\nu_4$ | 45.5 | $L_4$ |
| $r_8$ | 17.11 | $d_8$ | 3.0 | | | | | |
| $r_9$ | −204.46 | $d_9$ | 3.5 | $n_5$ | 1.805 | $\nu_5$ | 25.3 | $L_5$ |
| $r_{10}$ | −20.33 | $d_{10}$ | 1.0 | $n_6$ | 1.796 | $\nu_6$ | 45.5 | $L_6$ |
| $r_{11}$ | −192.0 | $d_{11}$ | 2.7 | | | | | |
| $r_{12}$ | −21.45 | $d_{12}$ | 1.0 | $n_7$ | 1.713 | $\nu_7$ | 53.9 | $L_7$ |
| $r_{13}$ | 17.47 | $d_{13}$ | 3.3 | $n_8$ | 1.796 | $\nu_8$ | 40.9 | $L_8$ |
| $r_{14}$ | −568.20 | $d_{14}$ | variable | | | | | |
| $r_{15}$ | 88.81 | $d_{15}$ | 4.0 | $n_9$ | 1.713 | $\nu_9$ | 53.9 | $L_9$ |
| $r_{16}$ | −25.60 | $d_{16}$ | 0.5 | | | | | |
| $r_{17}$ | −21.70 | $d_{17}$ | 1.0 | $n_{10}$ | 1.805 | $\nu_{10}$ | 25.3 | $L_{10}$ |
| $r_{18}$ | −38.63 | $d_{18}$ | 0.1 | | | | | |
| $r_{19}$ | 35.59 | $d_{19}$ | 2.0 | $n_{11}$ | 1.568 | $\nu_{11}$ | 56.0 | $L_{11}$ |
| $r_{20}$ | 64.42 | $d_{20}$ | variable | | | | | |
| $r_{21}$ | 23.62 | $d_{21}$ | 5.0 | $n_{12}$ | 1.563 | $\nu_{12}$ | 60.8 | $L_{12}$ |
| $r_{22}$ | 94.99 | $d_{22}$ | 1.5 | $n_{13}$ | 1.796 | $\nu_{13}$ | 45.5 | $L_{13}$ |
| $r_{23}$ | 22.35 | $d_{23}$ | 2.0 | | | | | |
| $r_{24}$ | 91.31 | $d_{24}$ | 3.0 | $n_{14}$ | 1.516 | $\nu_{14}$ | 64.1 | $L_{14}$ |
| $r_{25}$ | −36.06 | $d_{25}$ | 0.1 | | | | | |
| $r_{26}$ | −132.82 | $d_{26}$ | 5.0 | $n_{15}$ | 1.518 | $\nu_{15}$ | 60.3 | $L_{15}$ |
| $r_{27}$ | −24.13 | $d_{27}$ | 0.6 | | | | | |
| $r_{28}$ | −21.25 | $d_{28}$ | 1.4 | $n_{16}$ | 1.749 | $\nu_{16}$ | 35.1 | $L_{16}$ |
| $r_{29}$ | −39.27 | | | | | | | |

(Lens groupings: $L_1$–$L_3$: $G_1$; $L_4$–$L_8$: $G_2$; $L_9$–$L_{11}$: $G_{31}$; $L_{12}$–$L_{16}$: $G_{32}$; $G_{31}$ and $G_{32}$ together form $G_3$)

|  | $F_W = 36.2$ | $F_M = 60$ | $F_T = 103$ |
|---|---|---|---|
| $d_6$ | 1.51 | 11.04 | 20.26 |
| $d_{14}$ | 12.49 | 6.75 | 1.38 |
| $d_{20}$ | 10.11 | 6.3 | 2.46 |
| Stop, ahead of $L_9$ | 0.8 | 0.8 | 0.8 |
| Bf | 51.01 | 63.68 | 76.50 |
|  | $\nu_2 = 1.817$ | | |

16. A zoom lens according to claim 14, wherein numerical data are as follows:

| Focal length F = 35~105, Zoom ratio 3, F-number 3.5~4.5, Image height y = 21.6 | | |
|---|---|---|
| Radius of | Center thickness | Refractive |

-continued

| | curvature | | and air space | | index | | Abbe number | | |
|---|---|---|---|---|---|---|---|---|---|
| $r_1$ | 150.69 | $d_1$ | 1.3 | $n_1$ | 1.805 | $\nu_1$ | 25.3 | $L_1$ | ⎫ |
| $r_2$ | 58.13 | $d_2$ | 0.4 | | | | | | ⎪ |
| $r_3$ | 66.23 | $d_3$ | 6.2 | $n_2$ | 1.603 | $\nu_2$ | 60.6 | $L_2$ | ⎬ $G_1$ |
| $r_4$ | −128.09 | $d_4$ | 0.1 | | | | | | ⎪ |
| $r_5$ | 33.14 | $d_5$ | 3.9 | $n_3$ | 1.603 | $\nu_3$ | 60.6 | $L_3$ | ⎭ |
| $r_6$ | 67.54 | $d_6$ | variable | | | | | | |
| $r_7$ | 62.79 | $d_7$ | 1.0 | $n_4$ | 1.796 | $\nu_4$ | 45.5 | $L_4$ | ⎫ |
| $r_8$ | 17.07 | $d_8$ | 3.0 | | | | | | ⎪ |
| $r_9$ | −213.87 | $d_9$ | 1.0 | $n_5$ | 1.805 | $\nu_5$ | 25.3 | $L_5$ | ⎪ |
| $r_{10}$ | −20.49 | $d_{10}$ | 1.0 | $n_6$ | 1.796 | $\nu_6$ | 45.5 | $L_6$ | ⎬ $G_2$ |
| $r_{11}$ | −194.15 | $d_{11}$ | 2.7 | | | | | | ⎪ |
| $r_{12}$ | −21.48 | $d_{12}$ | 1.0 | $n_7$ | 1.713 | $\nu_7$ | 53.9 | $L_7$ | ⎪ |
| $r_{13}$ | 17.23 | $d_{13}$ | 3.5 | $n_8$ | 1.796 | $\nu_8$ | 40.9 | $L_8$ | ⎭ |
| $r_{14}$ | −696058 | $d_{14}$ | variable | | | | | | |
| $r_{15}$ | 122.05 | $d_{15}$ | 4.0 | $n_9$ | 1.713 | $\nu_9$ | 53.9 | $L_8$ | ⎫ |
| $r_{16}$ | −24.80 | $d_{16}$ | 0.4 | | | | | | ⎪ |
| $r_{17}$ | −21.54 | $d_{17}$ | 1.0 | $n_{10}$ | 1.805 | $\nu_{10}$ | 25.3 | $L_{10}$ | ⎬ $G_{31}$ ⎫ |
| $r_{18}$ | −38.91 | $d_{18}$ | 0.1 | | | | | | ⎪ ⎪ |
| $r_{19}$ | 35.07 | $d_{19}$ | 2.0 | $n_{11}$ | 1.568 | $\nu_{11}$ | 56.0 | $L_{11}$ | ⎭ ⎪ |
| $r_{20}$ | 72.08 | $d_{20}$ | variable | | | | | | ⎪ |
| $r_{21}$ | 21.96 | $d_{21}$ | 4.0 | $n_{12}$ | 1.563 | $\nu_{12}$ | 60.8 | $L_{12}$ | ⎫ ⎬ $G_3$ |
| $r_{22}$ | 34.58 | $d_{22}$ | 1.5 | $n_{13}$ | 1.796 | $\nu_{13}$ | 45.5 | $L_{13}$ | ⎬ ⎪ |
| $r_{23}$ | 20.50 | $d_{23}$ | 2.0 | | | | | | ⎭ ⎪ |
| $r_{24}$ | 104.25 | $d_{24}$ | 4.0 | $n_{14}$ | 1.518 | $\nu_{14}$ | 60.3 | $L_{14}$ | ⎫ $G_{32}$ ⎪ |
| $r_{25}$ | −31.38 | $d_{25}$ | 0.1 | | | | | | ⎪ |
| $r_{26}$ | −95.95 | $d_{26}$ | 5.5 | $n_{15}$ | 1.563 | $\nu_{15}$ | 60.8 | $L_{15}$ | ⎬ |
| $r_{27}$ | −16.37 | $d_{27}$ | 1.4 | $n_{16}$ | 1.796 | $\nu_{16}$ | 40.9 | $L_{16}$ | ⎭ |
| $r_{28}$ | −45.88 | | | | | | | | |

| | $F_W = 36.2$ | $F_M = 60$ | $F_T = 103$ |
|---|---|---|---|
| $d_6$ | 0.98 | 10.62 | 19.77 |
| $d_{14}$ | 12.52 | 6.77 | 1.49 |
| $d_{20}$ | 10.84 | 6.96 | 3.08 |
| Stop. ahead of $L_9$ | 0.8 | 0.8 | 0.8 |
| Bf | 52.36 | 65.30 | 78.24 |
| | $\nu_2 = 1.817$ | | |

17. A zoom lens including a wide angle of view and consisting of, in succession from the object side, a first lens group of positive refractive power, a second lens group of negative refractive power and a third lens group of positive refractive power and capable of effecting magnification change by the second lens group being moved relative to the first and third lens groups, characterized in that when zooming is effected from the wide angle end to the telephoto end, said first lens group and said third lens group are monotonously moved toward the object side and said second lens group is moved toward the object side at least near the wide angle end so that the position at which the principal light ray of a maximum angle of view cuts said first lens group is nearer to the optical axis, whereby the aperture of said first lens group can be kept small, said zoom lens further comprising cam means rotatable to effect magnification change, said first, second and third lens groups being moved in accordance with the angle of the rotation of said cam means, and wherein, when magnification change is effected from the wide angle end toward the telephoto end by the rotation of said cam means, said first lens group is rectilinearly moved toward the object side, said second lens group depicts a curve convex toward the object side and lies most adjacent to the object side at a position between the wide angle end and the telephoto end, and said third lens group has the image plane correcting function and is monotonously moved toward the object side while depicting a non-linear locus having a point of inflection.

18. A zoom lens including a wide angle of view and having, in succession from the object side, a first lens group of positive refractive power, a second lens group of negative refractive power and a third lens group of positive refractive power and capable of effecting magnification change by the second lens group being moved relative to the first and third lens groups, characterized in that when zooming is effected from the wide angle end to the telephoto end, said first lens group and said third lens group are monotonously moved toward the object side and said second lens group is moved toward the object side at least near the wide angle end so that the position at which the principal light ray of a maximum angle of view cuts said first lens group is nearer to the optical axis, whereby the aperture of said first lens group can be kept small, said zoom lens further comprising cam means rotatable to effect magnification change, said first, second and third lens groups being moved in accordance with the angle of the rotation of said cam means, wherein when magnification change is effected from the wide angle end toward the telephoto end by the rotation of said cam means, said first lens group is rectilinearly moved toward the object side, said second lens group depicts a curve convex toward the object side and lies most adjacent to the object side at a position between the wide angle end and the telephoto end, and said third lens group has the image plane correcting function and is monotonously moved toward the object side while depicting a non-linear locus having a point of inflection, and wherein said first lens group has, in succession from the object side, a negative meniscus lens ($L_1$) having its convex surface facing the object side, a biconvex positive lens ($L_2$) cemented thereto or separated therefrom, and a positive meniscus lens ($L_3$) having its convex surface facing the object side, and said second lens group has, in succession from the object side, a negative meniscus lens ($L_4$) having its convex surface facing the object side, a positive lens ($L_5$) having its surface of sharper curvature facing the image side, a negative lens ($L_6$) separated therefrom or cemented thereto and having its surface of sharper curvature facing the object side, a biconcave lens ($L_7$) and a biconvex lens ($L_8$) cemented thereto.

19. A zoom lens according to claim 18, wherein said third lens group ($G_3$) has, in succession from the object side, a positive lens ($L_9$) having its surface of sharper curvature facing the image side, a negative meniscus lens ($L_{10}$) cemented thereto and having its convex surface facing the image side, a positive lens ($L_{11}$) having its surface of sharper curvature facing the object side, a negative lens ($L_{12}$) having its surface of sharper curvature facing the image side, a positive lens ($L_{13}$) having its surface of sharper curvature facing the image side, a positive lens ($L_{14}$) having its surface of sharper curvature facing the image side, and a negative lens ($L_{15}$) cemented thereto and having its surface of sharper curvature facing the object side.

20. A zoom lens according to claim 19, wherein, when the shape factors of the positive lens ($L_{11}$) in said third lens group ($G_3$) having its surface of sharper curvature facing the object side and the negative lens ($L_{12}$) having its surface of sharper curvature facing the image side are $q_{11}$ and $q_{12}$, respectively, the following conditions are satisfied:

$$0.8 < q_{11} < 1.2$$

$$0.7 < |q_{12}| < 2.0$$

where the shape factor q is defined as $$q = \frac{R_2 + R_1}{R_2 - R_1}$$

where $R_1$ is the radius of curvature of the surface of each lens which is adjacent to the object side and $R_2$ is the radius of curvature of the surface of each lens which is adjacent to the image side.

21. A zoom lens according to the claim 20, wherein numerical data are as follows:

Focal length F = 35–105, Zoom ratio 3, F-number 3.5, Image height y = 21.6

| | Radius of curvature | | Center thickness and air space | | Refractive index | | Abbe number | | |
|---|---|---|---|---|---|---|---|---|---|
| $r_1$ | 130.39 | $d_1$ | 1.3 | $n_1$ | 1.784 | $\nu_1$ | 26.0 | $L_1$ | |
| $r_2$ | 51.24 | $d_2$ | 7.7 | $n_2$ | 1.563 | $\nu_2$ | 60.8 | $L_2$ | $G_1$ |
| $r_3$ | −135.31 | $d_3$ | 0.1 | | | | | | |
| $r_4$ | 34.94 | $d_4$ | 4.5 | $n_3$ | 1.603 | $\nu_3$ | 60.6 | $L_3$ | |
| $r_5$ | 79.56 | $d_5$ | variable | | | | | | |
| $r_6$ | 51.99 | $d_6$ | 1.0 | $n_4$ | 1.772 | $\nu_4$ | 49.4 | $L_4$ | |
| $r_7$ | 16.04 | $d_7$ | 4.0 | | | | | | |
| $r_8$ | −31.09 | $d_8$ | 2.0 | $n_5$ | 1.756 | $\nu_5$ | 31.7 | $L_5$ | |
| $r_9$ | −25.98 | $d_9$ | 0.8 | | | | | | |
| $r_{10}$ | −43.98 | $d_{10}$ | 1.3 | $n_6$ | 1.713 | $\nu_6$ | 53.9 | $L_6$ | |
| $r_{11}$ | −251.47 | $d_{11}$ | 3.0 | | | | | | |
| $r_{12}$ | −16.14 | $d_{12}$ | 1.0 | $n_7$ | 1.620 | $\nu_7$ | 60.2 | $L_7$ | |
| $r_{13}$ | 32.55 | $d_{13}$ | 4.5 | $n_8$ | 1.756 | $\nu_8$ | 31.7 | $L_8$ | |
| $r_{14}$ | −42.44 | $d_{14}$ | variable | | | | | | |
| $r_{15}$ | 58.50 | $d_{15}$ | 6.5 | $n_9$ | 1.501 | $\nu_9$ | 56.4 | $L_9$ | |
| $r_{16}$ | −21.24 | $d_{16}$ | 1.2 | $n_{10}$ | 1.796 | $\nu_{10}$ | 45.5 | $L_{10}$ | |
| $r_{17}$ | −57.27 | $d_{17}$ | 0.1 | | | | | | |
| $r_{18}$ | 28.31 | $d_{18}$ | 5.0 | $n_{11}$ | 1.514 | $\nu_{11}$ | 54.6 | $L_{11}$ | |
| $r_{19}$ | −1023.03 | $d_{19}$ | 6.3 | | | | | | $G_3$ |
| $r_{20}$ | 128.42 | $d_{20}$ | 1.5 | $n_{12}$ | 1.755 | $\nu_{12}$ | 27.6 | $L_{12}$ | |
| $r_{21}$ | 32.68 | $d_{21}$ | 3.4 | | | | | | |
| $r_{22}$ | −157.59 | $d_{22}$ | 3.4 | $n_{13}$ | 1.518 | $\nu_{13}$ | 60.3 | $L_{13}$ | |
| $r_{23}$ | −33.35 | $d_{23}$ | 0.2 | | | | | | |
| $r_{24}$ | 36.88 | $d_{24}$ | 11.0 | $n_{14}$ | 1.516 | $\nu_{14}$ | 64.1 | $L_{14}$ | |
| $r_{25}$ | −19.33 | $d_{25}$ | 1.0 | $n_{15}$ | 1.796 | $\nu_{15}$ | 45.5 | $L_{15}$ | |
| $r_{26}$ | −95.09 | | | | | | | | |

| | $F_W = 36.2$ | $F_M = 60$ | $F_T = 103$ |
|---|---|---|---|
| $d_5$ | 1.12 | 10.22 | 21.60 |
| $d_{14}$ | 17.94 | 9.80 | 2.37 |
| Stop, behind $L_8$ | 14.6 | 3.2 | 1.6 |
| Bf | 57.67 | 69.12 | 70.72 |
| $\nu_2 = 2.204$ | | | |

22. A zoom lens according to claim 20, wherein numerical data are as follows:

Focal length F = 35–105, Zoom ratio 3, F-number 3.5–4.3, Image height y = 21.6

| | Radius of curvature | | Center thickness air space | | Refractive index | | Abbe number | | |
|---|---|---|---|---|---|---|---|---|---|
| $r_1$ | 178.48 | $d_1$ | 1.3 | $n_1$ | 1.755 | $\nu_1$ | 27.6 | $L_1$ | |
| $r_2$ | 46.12 | $d_2$ | 8.5 | $n_2$ | 1.547 | $\nu_2$ | 53.6 | $L_2$ | $G_1$ |
| $r_3$ | −101.71 | $d_3$ | 0.1 | | | | | | |
| $r_4$ | 32.61 | $d_4$ | 4.0 | $n_3$ | 1.603 | $\nu_3$ | 60.6 | $L_3$ | |
| $r_5$ | 73.64 | $d_5$ | variable | | | | | | |
| $r_6$ | 62.48 | $d_6$ | 1.0 | $n_4$ | 1.796 | $\nu_4$ | 40.9 | $L_4$ | |
| $r_7$ | 15.51 | $d_7$ | 4.1 | | | | | | |
| $r_8$ | −172.67 | $d_8$ | 2.7 | $n_5$ | 1.795 | $\nu_5$ | 28.5 | $L_5$ | |
| $r_9$ | −25.48 | $d_9$ | 1.3 | $n_6$ | 1.796 | $\nu_6$ | 40.9 | $L_6$ | $G_2$ |
| $r_{10}$ | 272.88 | $d_{10}$ | 2.2 | | | | | | |
| $r_{11}$ | −16.25 | $d_{11}$ | 1.0 | $n_7$ | 1.582 | $\nu_7$ | 46.4 | $L_7$ | |
| $r_{12}$ | 32.07 | $d_{12}$ | 3.7 | $n_8$ | 1.795 | $\nu_8$ | 28.5 | $L_8$ | |
| $r_{13}$ | −40.23 | $d_{13}$ | variable | | | | | | |
| $r_{14}$ | 62.70 | $d_{14}$ | 5.5 | $n_9$ | 1.501 | $\nu_9$ | 56.4 | $L_9$ | |
| $r_{15}$ | −20.68 | $d_{15}$ | 1.2 | $n_{10}$ | 1.796 | $\nu_{10}$ | 45.5 | $L_{10}$ | |
| $r_{16}$ | −55.81 | $d_{16}$ | 0.1 | | | | | | |
| $r_{17}$ | 25.11 | $d_{17}$ | 4.3 | $n_{11}$ | 1.514 | $\nu_{11}$ | 54.6 | $L_{11}$ | |

-continued

| | | | | | | | | | |
|---|---|---|---|---|---|---|---|---|---|
| $r_{18}$ | 1029.84 | $d_{18}$ | 6.2 | | | | | | |
| $r_{19}$ | −611.14 | $d_{19}$ | 3.0 | $n_{12}$ | 1.795 | $\nu_{12}$ | 28.5 | $L_{12}$ | |
| $r_{20}$ | 38.31 | $d_{20}$ | 2.5 | | | | | | $G_3$ |
| $r_{21}$ | −247.30 | $d_{21}$ | 3.3 | $n_{13}$ | 1.620 | $\nu_{13}$ | 60.2 | $L_{13}$ | |
| $r_{22}$ | −27.81 | $d_{22}$ | 0.1 | | | | | | |
| $r_{23}$ | 32.10 | $d_{23}$ | 8.2 | $n_{14}$ | 1.501 | $\nu_{14}$ | 56.4 | $L_{14}$ | |
| $r_{24}$ | −17.98 | $d_{24}$ | 1.0 | $n_{15}$ | 1.796 | $\nu_{15}$ | 45.5 | $L_{15}$ | |
| $r_{25}$ | −373.38 | | | | | | | | |

| | $F_W = 36$ | $F_M = 60$ | $F_T = 102.5$ |
|---|---|---|---|
| $d_5$ | 0.97 | 9.90 | 20.42 |
| $d_{13}$ | 20.57 | 11.73 | 3.44 |
| Stop, behind $L_8$ | 9.6 | 7.4 | 2.3 |
| Bf | 57.57 | 62.27 | 74.70 |
| | $\nu_2 = 2.024$ | | |

23. A zoom lens according to claim 20, wherein numerical data are as follows:

Focal length F = 35~105, Zoom ratio 3, F-number 3.5~4.3, Image height y = 21.6

| Radius of curvature | | Center thickness and air space | | Refractive index | | Abbe number | | | |
|---|---|---|---|---|---|---|---|---|---|
| $r_1$ | 130.66 | $d_1$ | 1.3 | $n_1$ | 1.795 | $\nu_1$ | 28.5 | $L_1$ | |
| $r_2$ | 46.67 | $d_2$ | 1.0 | | | | | | |
| $r_3$ | 46.51 | $d_3$ | 8.5 | $n_2$ | 1.563 | $\nu_2$ | 60.8 | $L_2$ | $G_1$ |
| $r_4$ | −112.14 | $d_4$ | 0.1 | | | | | | |
| $r_5$ | 31.47 | $d_5$ | 4.0 | $n_3$ | 1.603 | $\nu_3$ | 60.6 | $L_3$ | |
| $r_6$ | 58.68 | $d_6$ | variable | | | | | | |
| $r_7$ | 62.48 | $d_7$ | 1.0 | $n_4$ | 1.796 | $\nu_4$ | 40.9 | $L_4$ | |
| $r_8$ | 15.51 | $d_8$ | 4.1 | | | | | | |
| $r_9$ | −172.67 | $d_9$ | 2.75 | $n_5$ | 1.795 | $\nu_5$ | 28.5 | $L_5$ | |
| $r_{10}$ | −25.48 | $d_{10}$ | 1.3 | $n_6$ | 1.796 | $\nu_6$ | 40.9 | $L_6$ | $G_2$ |
| $r_{11}$ | 272.88 | $d_{11}$ | 2.29 | | | | | | |
| $r_{12}$ | −16.25 | $d_{12}$ | 1.0 | $n_7$ | 1.582 | $\nu_7$ | 46.4 | $L_7$ | |
| $r_{13}$ | 32.07 | $d_{13}$ | 3.7 | $n_8$ | 1.795 | $\nu_8$ | 28.5 | $L_8$ | |
| $r_{14}$ | −40.23 | $d_{14}$ | variable | | | | | | |
| $r_{15}$ | 62.99 | $d_{15}$ | 5.5 | $n_9$ | 1.501 | $\nu_9$ | 56.4 | $L_9$ | |
| $r_{16}$ | −20.77 | $d_{16}$ | 1.2 | $n_{10}$ | 1.796 | $\nu_{10}$ | 45.5 | $L_{10}$ | |
| $r_{17}$ | −56.06 | $d_{17}$ | 0.1 | | | | | | |
| $r_{18}$ | 25.23 | $d_{18}$ | 4.3 | $n_{11}$ | 1.514 | $\nu_{11}$ | 54.6 | $L_{11}$ | |
| $r_{19}$ | 1034.62 | $d_{19}$ | 6.9 | | | | | | |
| $r_{20}$ | −856.49 | $d_{20}$ | 1.5 | $n_{12}$ | 1.795 | $\nu_{12}$ | 28.5 | $L_{12}$ | $G_3$ |
| $r_{21}$ | 38.01 | $d_{21}$ | 2.59 | | | | | | |
| $r_{22}$ | −851.48 | $d_{22}$ | 4.0 | $n_{13}$ | 1.620 | $\nu_{13}$ | 60.2 | $L_{13}$ | |
| $r_{23}$ | −29.36 | $d_{23}$ | 0.16 | | | | | | |
| $r_{24}$ | 32.76 | $d_{24}$ | 8.2 | $n_{14}$ | 1.501 | $\nu_{14}$ | 56.4 | $L_{14}$ | |
| $r_{25}$ | −18.36 | $d_{25}$ | 1.0 | $n_{15}$ | 1.796 | $\nu_{15}$ | 45.5 | $L_{15}$ | |
| $r_{26}$ | −678.32 | | | | | | | | |

| | $F_W = 36.2$ | $F_M = 60$ | $F_T = 102.5$ |
|---|---|---|---|
| $d_6$ | 1.04 | 9.96 | 18.64 |
| $d_{14}$ | 21.05 | 12.13 | 3.45 |
| Stop, behind $L_8$ | 10.0 | 6.1 | 2.1 |
| Bf | 57.37 | 68.90 | 79.79 |
| | $\nu_2 = 1.857$ | | |

24. A zoom lens including a wide angle of view and having, in succession from the object side, a first lens group of positive refractive power, a second lens group of negative refractive power and a third lens group of positive refractive power and capable of effecting magnification change by the second lens group being moved relative to the first and third lens groups, characterized in that when zooming is effected from the wide angle end to the telephoto end, said first lens group and said third lens group are monotonously moved toward the object side and said second lens group is moved toward the object side at least near the wide angle end so that the position at which the principal light ray of a maximum angle of view cuts said first lens group is nearer to the optical axis, whereby the aperture of said first lens group can be kept small, said zoom lens comprising cam means rotatable to effect magnification change, said first, second and third lens groups being moved in accordance with the angle of the rotation of said cam means, wherein when magnification change is effected from the wide angle end toward the telephoto end by the rotation of said cam means, said first lens group is rectilinearly moved toward the object side, said second lens group has substantially the same positions at the wide angle end and the telephoto end relative to the image plane and is smoothly moved so as to lie most adjacent to the object side at the intermediate position, and said third lens group has the image plane correcting function and is monotonously moved toward the object side while depicting a non-linear locus having a point of inflection, and wherein said first lens group has, in succession from the object side, a negative meniscus lens ($L_1$) having its convex surface facing the object side, a biconvex positive lens ($L_2$) cemented thereto or separated therefrom, and a positive meniscus lens ($L_3$) having its convex surface facing the object side, and said second lens group has, in succession from the object side, a negative meniscus lens ($L_4$) having its convex surface facing the object side, a positive lens ($L_5$) having its surface of sharper curvature facing the image side, a negative lens ($L_6$) separated therefrom or cemented thereto and having its surface of sharper curvature facing the object side, a biconcave lens ($L_7$) and a biconvex lens ($L_8$) cemented thereto.

25. A zoom lens including a wide angle of view and having, in succession from the object side, a first lens group of positive refractive power, a second lens group of negative refractive power and a third lens group of positive refractive power and capable of effecting magnification change by the second lens group being moved relative to the first and third lens groups, characterized in that when zooming is effected from the wide angle end to the telephoto end, said first lens group and said third lens group are monotonously moved toward the object side and said second lens group is moved toward the object side at least near the wide angle end so that the position at which the principal light ray of a maximum angle of view cuts said first lens group is nearer to the optical axis, whereby the aperture of said first lens group can be kept small, further comprising cam means rotatable to effect magnification change, said first, second and third lens groups being moved in accordance with the angle of the rotation of said cam means, wherein when magnification change is effected from the wide angle end to the telephoto end by the rotation of said cam means, said first lens group is rectilinearly moved toward the object side, said second lens group is monotonously moved toward the object side while depicting a non-linear locus and lies more adjacent to the object side at the telephoto end than at the wide angle end, and said third lens group is rectilinearly moved toward the object side at the same velocity as said first lens group, and wherein said first lens group has, in succession from the object side, a negative meniscus lens ($L_1$) having its convex surface facing the object side, a biconvex positive lens ($L_2$) cemented thereto or separated therefrom, and a positive meniscus lens ($L_3$) having its convex surface facing the object side, and said second lens group has, in succession from the object side, a negative meniscus lens ($L_4$) having its convex surface facing the object side, a positive lens ($L_5$) having its surface of sharper curvature facing the image side, a negative lens ($L_6$) separated therefrom or cemented thereto and having its surface of sharper curvature facing the object side, a biconcave lens ($L_7$) and a biconvex lens ($L_8$) cemented thereto.

* * * * *